US012753105B2

(12) United States Patent
Campion et al.

(10) Patent No.: US 12,753,105 B2
(45) Date of Patent: Oct. 6, 2026

(54) METHODS OF CONTROLLING STEAM PRESSURE TO PRODUCE TITANIA-SILICA GLASS

(71) Applicant: CORNING INCORPORATED, Corning, NY (US)

(72) Inventors: Michael John Campion, Corning, NY (US); James Conrad Fajardo, Painted Post, NY (US); Sergey Nikolaevich Shubin, Espoo (FI); Chunfeng Zhou, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 162 days.

(21) Appl. No.: 18/668,752

(22) Filed: May 20, 2024

(65) Prior Publication Data

US 2025/0353776 A1 Nov. 20, 2025

(51) Int. Cl.
*C03B 19/06* (2006.01)

(52) U.S. Cl.
CPC .................................. *C03B 19/063* (2013.01)

(58) Field of Classification Search
None
See application file for complete search history.

(56) References Cited

U.S. PATENT DOCUMENTS

| | | | | |
|---|---|---|---|---|
| 5,086,352 | A | 2/1992 | Yamagata et al. | |
| 2008/0305941 | A1* | 12/2008 | Maida | C03C 4/0085 501/54 |
| 2010/0261597 | A1* | 10/2010 | Koike | C03C 3/06 501/53 |
| 2016/0137545 | A1* | 5/2016 | Annamalai | C03C 3/076 501/54 |

(Continued)

FOREIGN PATENT DOCUMENTS

| | | | |
|---|---|---|---|
| EP | 2145865 | A1 | 1/2010 |
| WO | 2009/145288 | A1 | 12/2009 |
| WO | 2025/117115 | A1 | 6/2025 |

OTHER PUBLICATIONS

Davis, et al, "Quantitative infrared spectroscopic measurement of hydroxyl concentration in silica glass," J. Non-Crystalline Solids, 203 (1996), pp. 27-36.

(Continued)

*Primary Examiner* — Queenie S Dehghan
(74) *Attorney, Agent, or Firm* — Amy T. Lang

(57) ABSTRACT

A process of forming a titania-silica glass body, the process including exposing a titania-doped silica soot body to a constant steam pressure step during which the partial steam pressure is at a first partial pressure of steam P1 that is from about 0 Torr to about 760 Torr and exposing the soot body to a ramp-up steam pressure step during which the partial steam pressure increases from the first partial pressure of steam P1 to a second partial pressure of steam P2, the second partial pressure of steam P2 being from about 50 Torr to (Continued)

about 760 Torr. The second partial pressure of steam P2 being greater than the first partial pressure of steam P1. The process further including heating the soot body during the constant steam pressure step and during the ramp-up steam pressure step and increasing the temperature during at least one of the constant steam pressure step and the ramp-up steam pressure step.

20 Claims, 12 Drawing Sheets

(56) References Cited

U.S. PATENT DOCUMENTS

| | | | | |
|---|---|---|---|---|
| 2024/0067558 | A1 | 2/2024 | Campion et al. | |
| 2024/0069429 | A1 | 2/2024 | Campion et al. | |
| 2025/0171345 | A1* | 5/2025 | Campion | C03C 27/06 |
| 2025/0178945 | A1* | 6/2025 | Campion | C03C 3/076 |

OTHER PUBLICATIONS

Wood et al., "Partition of Hydrogen in the Modified Chemical Vapor Deposition Process", J. Am. Ceram. Soc. 64 [6] (1981), pp. 325-327.

International Search Report and Written Opinion of the International Searching Authority; PCT/US2025/028066; dated Aug. 21, 2025; 10 pages; European Patent Office.

* cited by examiner

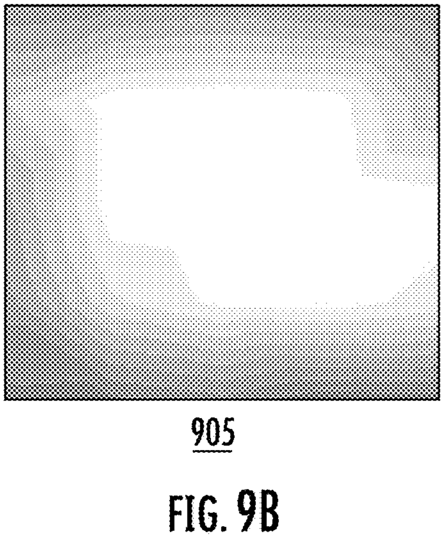
FIG. 9B
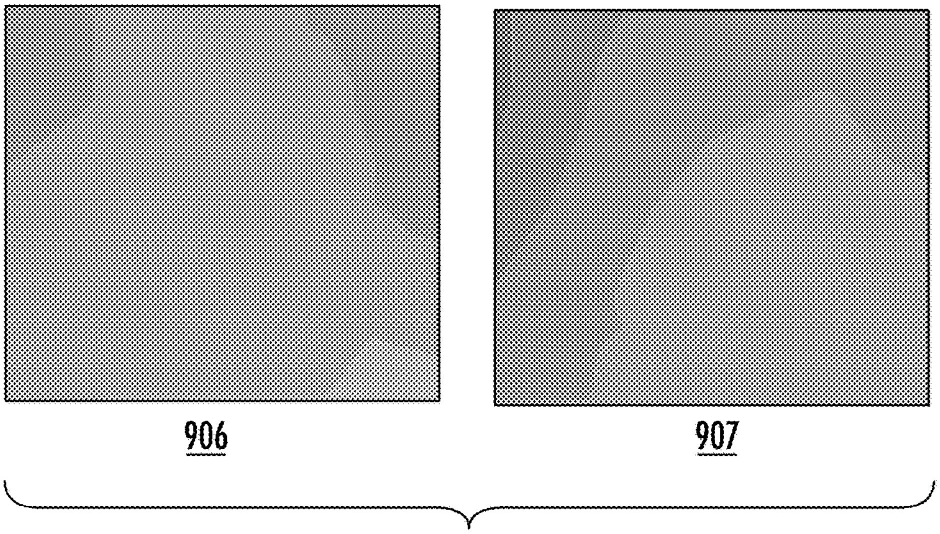
FIG. 9C
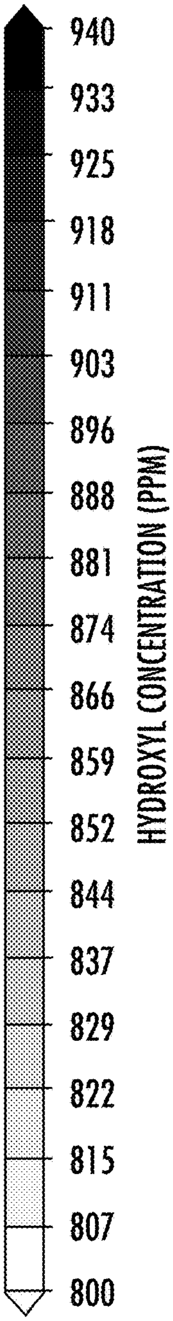

METHODS OF CONTROLLING STEAM PRESSURE TO PRODUCE TITANIA-SILICA GLASS

FIELD

The present disclosure is directed to methods of controlling steam pressure to produce titania-silica glass, and more specifically methods of controlling steam pressure to produce titania-silica glass with a uniform hydroxyl concentration. The produced glass article may be suitable for use in extreme ultraviolet lithography applications.

BACKGROUND

Extreme ultraviolet (EUV) lithography uses optics to illuminate, project, and reduce pattern images to form integrated circuit patterns. The use of extreme ultraviolet radiation is beneficial in that smaller integrated circuit features can be achieved. The optics for EUV lithography are currently made from low thermal expansion glass, such as silica-titania glass. The glass is traditionally made by a flame hydrolysis process in which high purity precursors are injected into flames to form fine glass particles that are then deposited onto a glass body.

In EUV lithography systems, the glass is typically coated with a reflective surface to form a reflective mirror. Furthermore, the glass, in an EUV lithography system, must be able to meet stringent thermal expansion requirements in the system. Specifically, the glass must be able to maintain its surface shape (known as "figure") when subject to temperature changes in the system. A temperature stable glass is necessary to avoid any induced distortions in the wavefront characteristics of EUV projection optics.

SUMMARY

Embodiments of the present disclosure comprise methods to produce glass bodies that are able to advantageously maintain their figure during operation of an EUV lithography system. Therefore, the glass bodies, according to the embodiments of the present disclosure, reduce or prevent any wavefront characteristics of EUV projection optics.

According to aspects of the present disclosure, a process of forming a titania-silica glass body is disclosed, the process comprising exposing a titania-doped silica soot body to a constant steam pressure step during which the partial pressure of steam is at a first partial pressure of steam P1 that is from about 0 Torr to about 760 Torr and exposing the soot body to a ramp-up steam pressure step during which the partial pressure increases from the first partial pressure of steam P1 to a second partial pressure of steam P2, the second partial pressure of steam P2 being from about 50 Torr to about 760 Torr. The second partial pressure of steam P2 being greater than the first partial pressure of steam P1. The process further comprising heating the soot body during the constant steam pressure step and during the ramp-up steam pressure step and increasing the temperature during at least one of the constant steam pressure step and the ramp-up steam pressure step.

According to aspects of the present disclosure, a process of forming a titania-silica glass body is disclosed, the process comprising exposing a titania-doped silica soot body to a constant steam pressure step during which the partial pressure of steam is at a first partial pressure of steam P1 that is from about 0 Torr to about 760 Torr and exposing the soot body to a ramp-up steam pressure step during which the partial pressure increases from the first partial pressure of steam P1 to a second partial pressure of steam P2, the second partial pressure of steam P2 being from about 50 Torr to about 760 Torr. The second partial pressure of steam P2 being greater than the first partial pressure of steam P1 and the rate of increase from the first partial pressure of steam P1 to the second partial pressure of steam P2 being from about 0.1 Torr/hour to about 10 Torr/hour. The process further comprising heating the soot body during the constant steam pressure step and during the ramp-up steam pressure step.

According to aspects of the present disclosure, a process of forming a titania-silica glass body is disclosed, the process comprising exposing a titania-doped silica soot body to a constant steam pressure step during which the partial pressure of steam is at a first partial pressure of steam P1 and exposing the soot body to a ramp-up steam pressure step during which the partial pressure increases from the first partial pressure of steam P1 to a second partial pressure of steam P2, the second partial pressure of steam P2 being greater than the first partial pressure of steam P1. The rate of increase from the first partial pressure of steam P1 to the second partial pressure of steam P2 being greater than or equal to a threshold ramp rate and radially outer portions of the titania-silica glass body having relatively higher concentrations of hydroxyl than a radially central portion of the titania-silica glass body.

BRIEF DESCRIPTION OF THE DRAWINGS

While the specification concludes with claims particularly pointing out and distinctly claiming the subject matter of the description, it is believed that the description will be better understood from the following specification when taken in conjunction with the accompanying drawings.

FIGS. 9A-9C show the hydroxyl concentration along samples of glass bodies, according to embodiments disclosed herein;

DETAILED DISCLOSURE

As used herein, "ppm" means parts per million by weight.

As used herein, "atm" means atmosphere.

Figure 1:
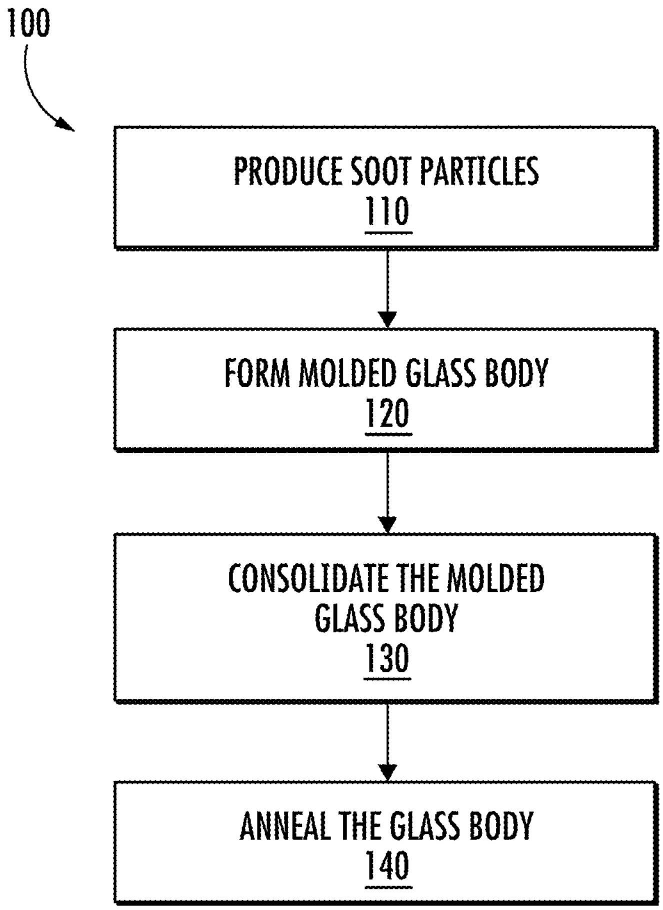
FIG. 1 is a flowchart of a process of forming a glass body, according to embodiments disclosed herein.

FIG. 1 depicts a process 100 to produce a titania ($TiO_2$) glass body suitable for use in EUV lithography applications. As discussed further below, the produced glass has uniform hydroxyl (OH) concentrations across the body. Because thermal expansion properties depend on hydroxyl concentration, a uniform distribution of hydroxyl is necessary to achieve a uniform thermal expansion across the glass body. Having a uniform thermal expansion across the glass body allows the glass body to not expand when exposed to different temperature environments, which is beneficial in, for example, lithography applications. Therefore, the body disclosed herein is suitable for use in, for example, EUV lithography applications. The glass may be Ultra Low Expansion glass (ULE® Glass) manufactured by Corning Incorporated.

EUV lithography technology relies on an optical projection system to expose a reflective photomask with EUV light, such that light reflected from the photomask is directed to a thin photosensitive layer deposited on the surface of a semiconductor wafer. This technique is commonly used in the semiconductor device production process. EUV lithography systems operate at a wavelength of light of about 13.5 nm. This extremely short wavelength poses a number of challenges to the design of the EUV systems. For example, reflective coatings on the mirror bodies in EUV systems are not able to reflect all of the light with such a low wavelength. About thirty percent of the light is absorbed by the reflective coatings, rather than reflected. The absorbed light produces undesirable heat in the mirror body, causing the mirror body to thermally expand or contract. Such changes in the mirror body can in turn cause the reflective coating, on the mirror body, to deform, which leads to distortions in the wavefront of the reflected light. Wavefront distortions may lead to deterioration in the resolution of the EUV system and errors in the patterns formed on the photosensitive layer.

Thus, the mirror bodies must be able to maintain their shape and figure even when subjected to the demanding thermal loads of EUV systems. Silica-titania glass, such as ULE® glass, is presently the material of choice for mirror bodies in EUV systems.

It has recently been shown that higher levels of uniformity in the silica-titania glass reduce any expansion or contraction of the glass in an EUV system. More specifically, with such higher levels of uniformity, the glass maintains its overall figure when subject to temperature changes in the EUV system. Embodiments of the present disclosure are directed to producing glass bodies with such uniformity. In particular, embodiments of the present disclosure are directed to producing glass bodies with uniform concentrations of hydroxyl.

Figure 2A:
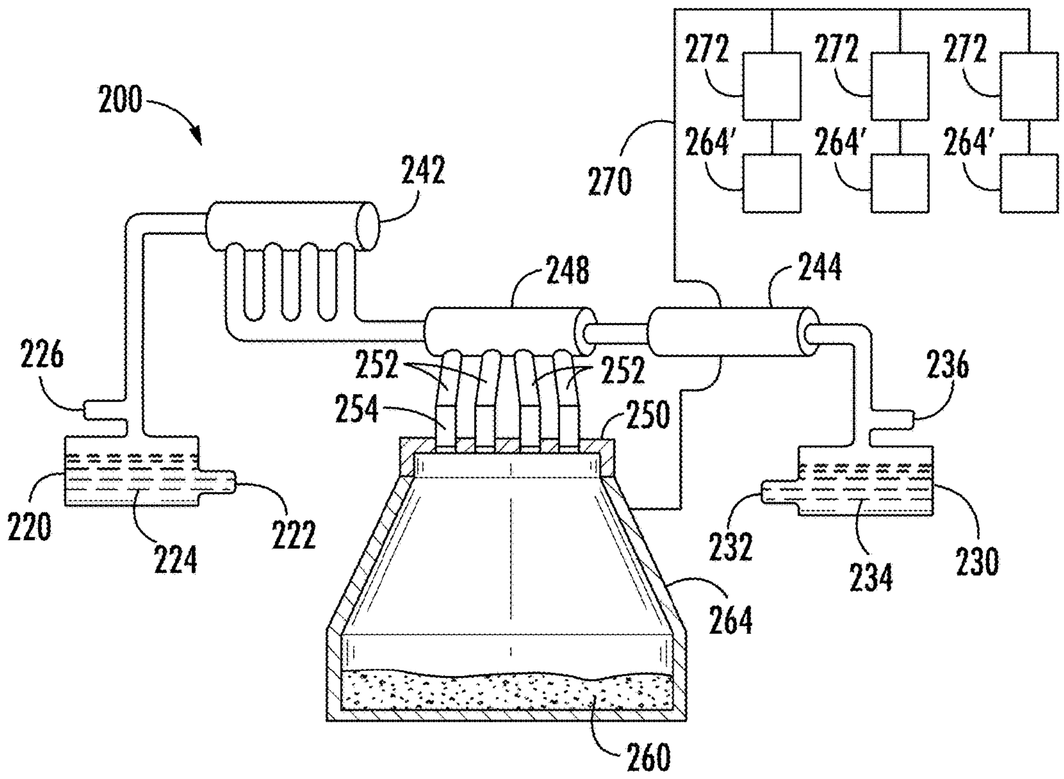
FIG. 2A is a schematic illustration of a system to produce loose soot particles in the process of FIG. 1, according to the embodiments disclosed herein.

With reference to FIG. 1, step 110 of process 100 comprises the production of soot particles. More specifically, step 110 comprises forming the soot particles as loose soot particles and then collecting the loose soot particles. FIG. 2A depicts a schematic representation of a system 200 to produce the loose soot particles using a chemical vapor deposition process. As shown in FIG. 2A, system 200 comprises a first reservoir 220 that houses a silica precursor 224 and a second reservoir 230 that houses a titania precursor 234. First reservoir 220 includes an inlet 222 for introduction of a carrier gas, such as nitrogen, at or near the base of the reservoir. The carrier gas forms a vaporous stream with the silica precursor 224. Similarly, second reservoir 230 includes an inlet 232 for introduction of a carrier gas, such as nitrogen, at or near the base of the reservoir. The carrier gas in second reservoir 230 forms a vaporous stream with the titania precursor 234.

The silica precursor 224 may comprise, for example, $SiCl_4$ and/or octamethylcyclotetrasiloxane (OMCTS). The titania precursor 234 may comprise, for example, $TiCl_4$, titanium isopropoxide (TPT), titanium tetraisopropoxide (TTIP), and/or tetraisopropyltitanate (TIPT).

Bypass streams of carrier gas are also introduced into system 200 at inlets 226 and 236 to prevent saturation of the vaporous silica stream and the vaporous titania stream. The vaporous silica stream then passes through distribution system 242 to manifold 248, and the vaporous titania stream passes through distribution system 244 to manifold 248.

The silica and titania vaporous streams then mix in manifold 248 to form a mixture of the two streams. As further shown in FIG. 2A, the mixture of the two streams flows to furnace 250. More specifically, the mixture of the two streams passes through fume lines 252 to burners 254 mounted in an upper portion of furnace 250. The two streams are further joined with a fuel/oxygen mixture at burners 254 to combust and oxidize the mixture. The fuel may be natural gas. The oxidation and combustion of the mixture forms loose soot particles 260, which are cooled and directed into collection chamber 264. Soot particles 260 comprise silicon dioxide and titanium dioxide. More specifically, the silicon dioxide and titanium dioxide in the particles mix at the atomic level to form Si—O—Ti bonds.

In some embodiments, soot particles 260 are directed upward through a tube 270 rather than downward into collection chamber 264. Tube 270 may be a quartz tube, which carries soot particles 260 in a vaporous stream to one or more filter bags 272. The soot particles 260 are removed from the vaporous stream by the filter bags 272 and are then deposited into one or more collection chambers 264'. For example, the soot particles 260 fall downward from filter bags 272 and into collection chambers 264'. A pulse of $N_2$ may periodically be applied to filter bags 272 to prevent the excess accumulation of soot particles 260 on the bags. In some embodiments, collection chambers 264' are stainless steel hoppers. The soot particles 260 can then be further collected from collection chambers 264' and deposited into barrels, where soot particles 260 may be stored until further use.

The produced soot particles 260 are spherical in shape with substantially uniform distributions of $SiO_2$ and $TiO_2$ within the particles. In addition to $SiO_2$ and $TiO_2$, the composition of soot particles 260 may also comprise CO and $CO_2$, which may be incorporated into the particles due to the fuel at burners 254. The size of each soot particle 260 may vary depending on the conditions of burners 254, but in general, soot particles 260 have an average diameter of about 20 nm to about 500 nm, or about 50 nm to about 400 nm, or about 60 nm to about 300 nm, or about 50 nm to about 100 nm.

Soot particles 260 may cool to about 200° C. or less, or about 175° C. or less, or about 150° C. or less, or about 125° C. or less, or about 100° C. or less, or about 75° C. or less, or about 50° C. or less, or about 25° C. or less, or about 20° C. or less before reaching collection chambers 264, 264'.

Figure 2B:
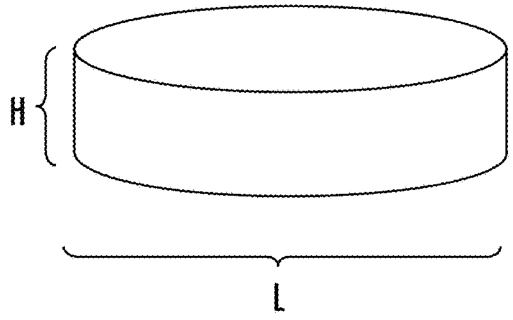
FIGS. 2B and 2C each show molded bodies according to the process of FIG. 1.
Figure 2C:
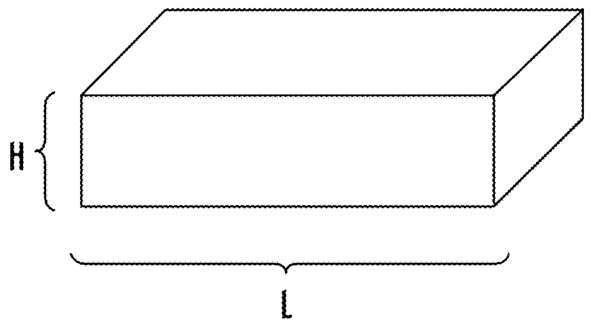

With reference again to FIG. 1, at step 120 of process 100, soot particles 60 are removed from collection chambers 264, 264' and deposited into a mold to form a pressed and molded body, which has a density of about 0.50 g/cm$^3$ or greater, or about 0.55 g/cm$^3$ or greater, or about 0.60 g/cm$^3$ or greater, or about 0.65 g/cm$^3$ or greater, or about 0.70 g/cm$^3$ or greater, or about 0.75 g/cm$^3$ or greater, or about 0.80 g/cm$^3$ or greater, or about 0.85 g/cm$^3$ or greater. Additionally or alternatively, the molded body has a density of about 1.50 g/cm$^3$ or less, or about 1.40 g/cm$^3$ or less, or about 1.30 g/cm$^3$ or less, or about 1.20 g/cm$^3$ or less, or about 1.15 g/cm$^3$ or less, or about 1.10 g/cm$^3$ or less, or about 1.00 g/cm$^3$ or less, or about 0.95 g/cm$^3$ or less, or about 0.90 g/cm$^3$ or less, or about 0.85 g/cm$^3$ or less, or about 0.80 g/cm$^3$ or less, or about 0.75 g/cm$^3$ or less, or about 0.70 g/cm$^3$ or less. In embodiments, the molded body has a density from about 0.50 g/cm$^3$ to about 1.50 g/cm$^3$, or about 0.60 g/cm$^3$ to about 1.40 g/cm$^3$, or about 0.80 g/cm$^3$ to about 1.30 g/cm$^3$, or about 0.90 g/cm$^3$ to about 1.00 g/cm$^3$, or about 0.80 g/cm$^3$ to about 1.50 g/cm$^3$, or about 0.80 g/cm$^3$ to about 1.20 g/cm$^3$, or about 0.80 g/cm$^3$ to about 0.90 g/cm$^3$. The molded body is formed such that any density variation in the body is about 5% or less, or about 4% or less, or about 3% or less, or about 2% or less, or about 1% or less, or about 0.75% or less, or about 0.50% or less, or about 0.25% or less, or about 0.20% or less, or about 0.15% or less, or about 0.10% or less, or about 0.05% or less, or about 0.02% or less, or about 0.01% or less, or about 0.00% from an average density across the body. FIG. 2B shows an exemplary cylindrical molded body and FIG. 2C shows an exemplary rectangular molded body, although the molded body may comprise other shapes than those specifically depicted herein. As shown in FIGS. 2B and 2C, the molded body has a length L and a height H. It is noted that the length L is also the diameter for the cylindrical body of FIG. 2B.

In embodiments, the length L of the body may be from about 20 mm to about 1300 mm, or about 40 mm to about 1200 mm, or about 60 mm to about 1000 mm, or about 80 mm to about 800 mm, or about 100 mm to about 60 mm, or about 20 mm to about 40 mm. Furthermore, in some embodiments, the height H of the body is about 50 m to about 500 mm, or about 60 mm to about 400 mm, or about 80 mm to about 200 mm, or about 100 mm to about 200 mm, or about 250 mm to about 500 mm, or about 250 mm to about 400 mm, or about 250 mm to about 300 mm, or about 200 mm to about 500 mm, or about 200 mm to about 400 mm, or about 200 mm to about 300 mm. However, it is noted that the length L and height H of the body can vary and are not limited by the embodiments disclosed herein. It is also noted that in some embodiments, the length L is larger than the height H of the body, while in other embodiments the height H is larger than the length L.

With reference again to process 100, at step 130, the molded body is then consolidated. After consolidation, the body is melted and then annealed at step 140 to relax any internal stress in the body. Relaxed internal stress allows for better quality cutting and machining of the body, such as slicing the body into a plurality of slices. In some embodiments, the body is annealed for a duration of about 100 hours or more, or about 200 hours or more, or about 250 hours or more. The maximum annealing temperature may be from about 750° C. to about 1200° C., or about 800° C. to about 1100° C., or about 900° C. to about 1000° C. Once the annealing step is complete, the body is ready for slicing.

In traditional consolidation processes (during step 130 of process 100), the molded body is placed into a consolidation furnace and heated. A traditional consolidation process includes heating the molded body to a temperature from about 900° C. to about 1100° C. and then slowly heating the body to a temperature from about 1100° C. to about 1300° C. at a heating rate of about 1° C./hour to about 36° C./hour. Furthermore, during the traditional consolidation process, the consolidation furnace is maintained at a constant steam pressure during both heating steps. However, such constant steam pressure can cause the produced body to have non-uniform hydroxyl concentrations. Heating the glass body during the consolidation process causes thermal drying of the glass, which causes the glass to lose hydroxide (OH) molecules. As the temperature increases during the consolidation process, the glass will lose more hydroxide molecules. Radially outward portions of the glass body lose more hydroxide molecules than radially inner portions as the radially outward portions experience more temperature change and, thus, more thermal drying. Therefore, the loss of hydroxide molecules manifests as a produced glass body with nonuniform and uneven concentrations of hydroxyl after the consolidation process. For example, the radially outer portions of the produced glass body will have lower concentrations of hydroxyl than the radially inner portions of the produced glass body.

Figure 3:
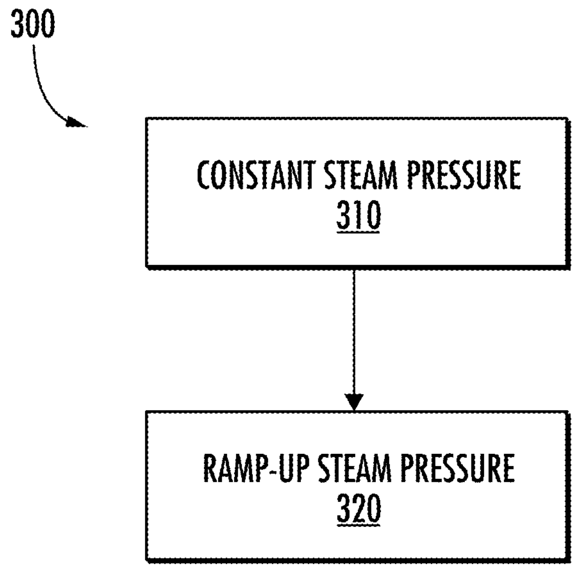
FIG. 3 is a flowchart of a consolidation process of the process of FIG. 1.

Embodiments of the present disclosure replace the constant steam pressure of the traditional consolidation process with process 300 of FIG. 3. As shown in FIG. 3, consolidation of the molded body (step 130 of process 100), according to the embodiments of the present disclosure, comprises exposing the molded body to a constant steam pressure step and to a ramp-up steam pressure step. More specifically, step 310 of FIG. 3 comprises the constant steam pressure step during which the body is held at a constant first partial pressure of steam. Step 320 of FIG. 3 comprises the ramp-up steam pressure step during which the partial pressure of steam is ramped-up and increases from the first partial pressure of steam to a second partial pressure of steam. It is also contemplated that one or more additional steps (although not explicitly disclosed herein) may be conducted between steps 310 and 320 of process 300. As discussed further below, the partial steam pressure ramp-up of step 320 may be linear or nonlinear.

Steps 310 and 320 of process 300 each comprise heating the glass body in the presence of steam, which is also referred to herein as steam doping. The glass body is doped with hydroxide during such steam doping so that the consolidated glass body has a relatively higher concentration of hydroxyl. The use of steam in the steam doping processes disclosed herein offers many benefits including the benefit of high hydroxyl concentration in the glass, which reduces viscosity, promotes low fictive temperature, and avoids seed formation in the glass. However, it is also noted that embodiments of the present disclosure also comprise the steam doping process with relatively low hydroxyl concentrations in the glass. Heating of the body during the constant steam pressure (step 310) and the ramp-up steam pressure (step 320) may be in an inert environment in the presence of an inert gas.

Figure 4A:
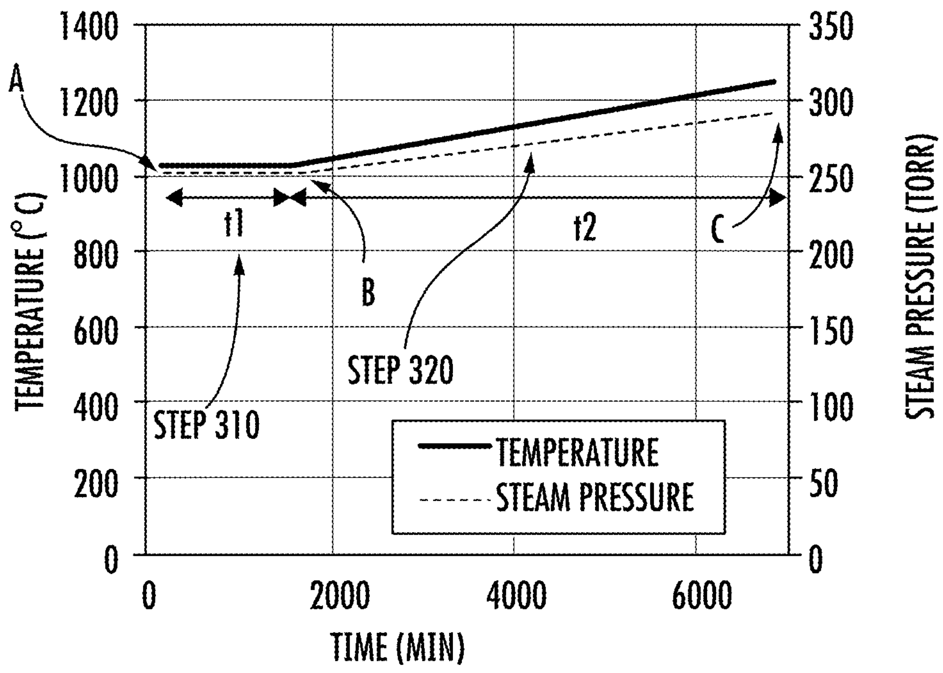
FIG. 4A is a plot of temperature vs. time for an exemplary consolidation process according to the process of FIG. 3.

FIG. 4A depicts an exemplary embodiment of process 300 of FIG. 3. As shown in FIG. 4A, the steam pressure steps of process 300 are depicted along with the temperature profile of the glass during consolidation. FIG. 4A also references three distinct points A, B, and C, which are each a moment in time during the consolidation of the glass body. Point A may be the beginning of the consolidation process or a point in time after the start of the consolidation process. Point B is after point A and, in some embodiments, coincides with the start of sintering of the glass body. Point C is after point B and may be the end of the of the consolidation process or a point in time before the end of the consolidation process.

Between points A and B of FIG. 4A, the partial steam pressure within the consolidation furnace is maintained at a constant value (or a substantially constant value). Therefore, between points A and B of FIG. 4A corresponds to the constant steam pressure (step 310) of process 300. During the constant steam pressure step (between points A and B), the partial steam pressure within the consolidation furnace is maintained at a first partial pressure of steam P1, which is an average partial pressure ranging from about 0 Torr to about 760 Torr (1 atm), or about 0 Torr to about 500 Torr, or about 0 Torr to about 300 Torr, or about 0 Torr to about 250 Torr, or about 5 Torr to about 760 Torr, or about 5 Torr to about 500 Torr, or about 5 Torr to about 300 Torr, or about 5 Torr to about 250 Torr, or about 5 Torr to about 100 Torr, or about 100 Torr to about 600 Torr, or about 200 Torr to about 500 Torr, or about 250 Torr to about 350 Torr, or about 275 Torr to about 350 Torr, or about 250 Torr to about 300 Torr. During the constant steam pressure step, the first partial pressure of steam P1 within the consolidation furnace is maintained at a constant steam pressure with any pressure varying only by about 5° C. or less, or about 4° C. or less, or about 3° C. or less, or about 2° C. or less, or about 1° C. or less, or about 0.5° C. or less from the average partial steam pressure. In the embodiment of FIG. 4A, during the constant steam pressure step (between points A and B), the average partial pressure of steam P1 within the consolidation furnace is 250 Torr.

At point B, the glass body has a hydroxyl concentration of about 200 ppm to about 900 ppm, or about 250 ppm to about 850 ppm, or about 300 ppm to about 800 ppm, or about 400 ppm to about 800 ppm, or about 600 ppm to about 800 ppm, or about 400 ppm to about 600 ppm, or about 500 ppm to about 600 ppm.

The time duration of the constant steam pressure step (between points A and B) is a first time duration t1. In embodiments, the first time duration t1 is from about 30 minutes to about 35 hours, or about 1 hour to about 30 hours, or about 1.5 hours to about 27 hours, or about 2 hours to about 25 hours, or about 4 hours to about 22 hours, or about 6 hours to about 20 hours, or about 8 hours to about 18 hours, or about 10 hours to about 15 hours, or about 12 hours to about 16 hours, or about 30 minutes to about 10 hours, or about 1 hour to about 8 hours, or about 15 hours to about 30 hours. In some exemplary embodiments, these time durations are for a body with a length L of 0.25 m and a height H of 0.25 m.

Additionally, as shown in FIG. 4A, between points A and B, the temperature within the consolidation furnace is maintained at a constant first temperature T1 that is an average temperature ranging from about 800° C. to about 1100° C., or about 825° C. to about 1075° C., or about 850° C. to about 1050° C., or about 875° C. to about 1025° C., or about 900° C. to about 1000° C., or about 925° C. to about 975° C., or about 950° C. to about 1000° C. Between points A and B, the body may be held at the first temperature T1 such that the temperature is constant with any temperature varying only by about 5° C. or less, or about 4° C. or less, or about 3° C. or less, or about 2° C. or less, or about 1° C. or less, or about 0.5° C. or less from the average temperature. Due to such constant temperature between points A and B, this time duration may also be referred to as an isothermal hold.

As shown in FIG. 4A, point B represents the end of the constant steam pressure with the first partial pressure of steam P1 and the end of the constant first temperature T1 within the consolidation furnace and the beginning of the ramp-up steps. However, it is also noted that in some embodiments, as discussed further below, the end of the constant steam pressure (point B) may be before or after the end of the constant first temperature T1.

At the end of the constant steam pressure step (step 310), the furnace is at the first partial pressure of steam P1 at point B. The body is then exposed to the ramp-up step (step 320) during which the partial pressure of the furnace increases from the first partial pressure of steam P1 (at point B) to a second partial pressure of steam P2 (at point C).

Between points B and C of FIG. 4A the partial pressure of steam within the consolidation furnace is increased. Therefore, between points B and C of FIG. 4A corresponds to the ramp-up steam pressure step (step 320) of process 300. During the ramp-up steam pressure step (between points B and C) the partial pressure of steam within the consolidation furnace increases from the first partial pressure of steam P1 to the second partial pressure of steam P2. In embodiments, the second partial pressure of steam P2, which is at point C, is from about 50 Torr to about 760 Torr (1 atm), or about 100 Torr to about 700 Torr, or about 200 Torr to about 700 Torr, or about 200 Torr to about 600 Torr, or about 250 Torr to about 500 Torr, or about 400 Torr to about 600 Torr. It is noted that the second partial pressure of steam P2 is greater than the first partial pressure of steam P1. Therefore, the partial pressure of steam at point C is greater than the partial pressure of steam at point B. In some embodiments, the second partial pressure of steam P2 is about 5 Torr to about 20 Torr greater than the first partial pressure of steam P1, or about 10 Torr to about 15 Torr greater than the first partial pressure of steam P1. In the embodiment of FIG. 4A, the second partial pressure of steam P2 within the consolidation furnace is 295 Torr.

The rate of increase in partial pressure of steam from the first partial pressure of steam P1 at point B to the second partial pressure of steam P2 at point C may be from about 0.1 Torr/hour to about 10 Torr/hour, or about 0.2 Torr/hour to about 8 Torr/hour, or about 0.3 Torr/hour to about 6 Torr/hour, or about 0.4 Torr/hour to about 5.5 Torr/hour, or about 0.5 Torr/hour to about 5 Torr/hour, or about 0.6 Torr/hour to about 4 Torr/hour, or about 0.7 Torr/hour to about 3 Torr/hour, or about 0.8 Torr/hour to about 2 Torr/hour, or about 0.9 Torr/hour to about 2 Torr/hour, or about 1 Torr/hour to about 6 Torr/hour, or about 1 Torr/hour to about 5 Torr/hour.

At point C, the glass body has a hydroxyl concentration of about 200 ppm to about 900 ppm, or about 250 ppm to about 850 ppm, or about 300 ppm to about 800 ppm, or about 400 ppm to about 800 ppm, or about 600 ppm to about 800 ppm, or about 400 ppm to about 600 ppm, or about 500 ppm to about 600 ppm. The glass body has a higher hydroxyl concentration at point C than at point B.

The time duration of the ramp-up steam pressure step (between points B and C) is a second time duration t2, which is of sufficient length to fully consolidate the glass body. In embodiments, the second time duration t2 is about 6 hours or greater, or about 10 hours or greater, or about 1 day or greater, or about 2 days or greater, or about 3 days or greater, or about 4 days or greater, or about 5 days or greater, or about 6 days or greater, or about 7 days or greater, or about 8 days or greater, or about 9 days or greater, or about 10 days or greater. In some embodiments, the maximum time duration of the second time duration is about 20 days or less, or about 18 days or less, or about 16 days or less, or about 14 days or less, or about 12 days or less, or about 10 days or less, or about 8 days or less, or about 6 days or less, or about 4 days or less, or about 2 days or less, or about 1 day or less. In some exemplary embodiments, these time durations are for a body with a length L of 0.25 m and a height H of 0.25 m. The second time duration t2 may be greater than the first time duration t1.

Additionally, between points B and C, the temperature within the consolidation furnace may be increased from the first temperature T1 at point B to a second temperature T2 at point C. The second temperature T2 may be from about 1050° C. to about 1250° C., or about 1100° C. to about 1200° C., or about 1125° C. to about 1200° C., or about 1150° C. to about 1200° C., or about 1100° C. to about 1150° C., or about 1125° C. to about 1175° C., or about 1125° C. to 1150° C.

The increase in temperature from the first temperature T1 to the second temperature T2 may be at a rate of about 20° C./hour or greater, or about 25° C./hour or greater, or about 30° C./hour or greater, or about 35° C./hour or greater, or about 40° C./hour or greater, or about 45° C./hour or greater, or about 50° C./hour or greater, or about 55° C./hour or greater, or about 60° C./hour or greater, or about 65° C./hour or greater, or about 70° C./hour or greater, or about 75° C./hour or greater, or about 80° C./hour or greater. In some embodiments, the increase in temperature from T1 to T2, during the ramp-up step, may be at a rate from about 20° C./hour to about 120° C./hour, or about 30° C./hour to about 100° C./hour, or about 40° C./hour to about 80° C./hour, or about 50° C./hour to about 100° C./hour, or about 50° C./hour to about 80° C./hour.

After completion of the ramp-up steam pressure step (step 320), the body is a fully dense titania-doped silica glass body and is substantially free of any inclusions or voids. Therefore, the second time duration t2 must be long enough to completely consolidate the titania-doped silica soot compact into the fully dense titania-doped silica glass body. In embodiments, the fully dense titania-doped silica glass body is a glass article or an optical element.

While not wishing to be bound by theory, it is believed that the majority of the glass sintering to fully consolidate the body is performed during the ramp-up steam pressure step disclosed herein (step 320). However, as also discussed above, sintering of the glass body causes thermal drying of the glass body, which causes the glass body to lose hydroxide molecules. The glass body will continuously lose hydroxide molecules as the temperature of the glass body increases during the sintering process. The continuous loss of hydroxide molecules manifests as an uneven concentration of hydroxyl throughout the produced glass body, with radially outer portions of the glass body having lower concentrations of hydroxyl than radially inner portions of the glass body. But the embodiments of the present disclosure ramp-up and increase the steam pressure during the sintering of the glass body. More specifically, the ramp-up steam pressure step, as disclosed herein, increases the steam pressure within the furnace, which counteracts the thermal drying of the glass body during the sintering process. The increase in steam pressure causes an influx of hydroxide molecules into the glass body, thus increasing the hydroxyl concentration in the glass body. Stated another way, the thermal drying of the glass body produces an outflux of hydroxide molecules, which is counteracted by the influx of hydroxide molecules from the disclosed ramp-up steam pressure step. This in turn advantageously produces the uniform hydroxyl concentrations disclosed herein.

The influx of hydroxide molecules into the glass body during the disclosed ramp-up steam pressure step counteracts the loss of hydroxide molecules that occurs from thermal drying of the glass, as discussed above. This counterbalancing of the hydroxide molecules within the glass body helps to advantageously provide a uniform hydroxyl concentration throughout the produced glass body, as also discussed above. It is also contemplated that the influx of hydroxide molecules into the glass body during the ramp-up steam pressure step is used to increase the hydroxyl concentration in certain portions of the produced glass body. For example, to produce a glass body with relatively higher concentrations of hydroxyl at radially inner portions of the glass body or to produce a glass body with relatively higher concentrations of hydroxyl at radially outer portions of the glass body. It is noted that the time duration and rate of increase of the ramp-up steam pressure step can each be modified to design glass bodies with specific portions of the glass body having relatively higher concentrations of hydroxyl than other portions of the glass bodies. For example, it has been found that a relatively longer time duration of the ramp-up steam pressure step allows the steam to penetrate further into the glass body, thus producing a glass body with a relatively higher hydroxyl concentration at a radially inner portion of the glass body. As another example, it has been found that a relatively shorter time duration of the ramp-up steam pressure step does not allow the steam to penetrate as far into the glass body, thus producing a glass body with a relatively lower hydroxyl concentration at a radially inner portion of the glass body. Therefore, the time duration of the ramp-up steam pressure step can be used to customize the hydroxyl concentration layout and geography along the glass body.

With reference again to FIG. 4A, during the ramp-up steam pressure step (step 320), the rate of steam pressure increase generally follows the rate of temperature increase. Thus, in this embodiment, the steam pressure and temperature generally increase together from point B to point C. However, it is also contemplated, in other embodiments, that the steam pressure may increase differently from the temperature during the ramp-up steam pressure step. For example, in some embodiments, the temperature may increase linearly while the steam pressure increases nonlinearly. In yet some other embodiments, the steam pressure may increase at a much lower rate than the increase of temperature.

Figure 4B:
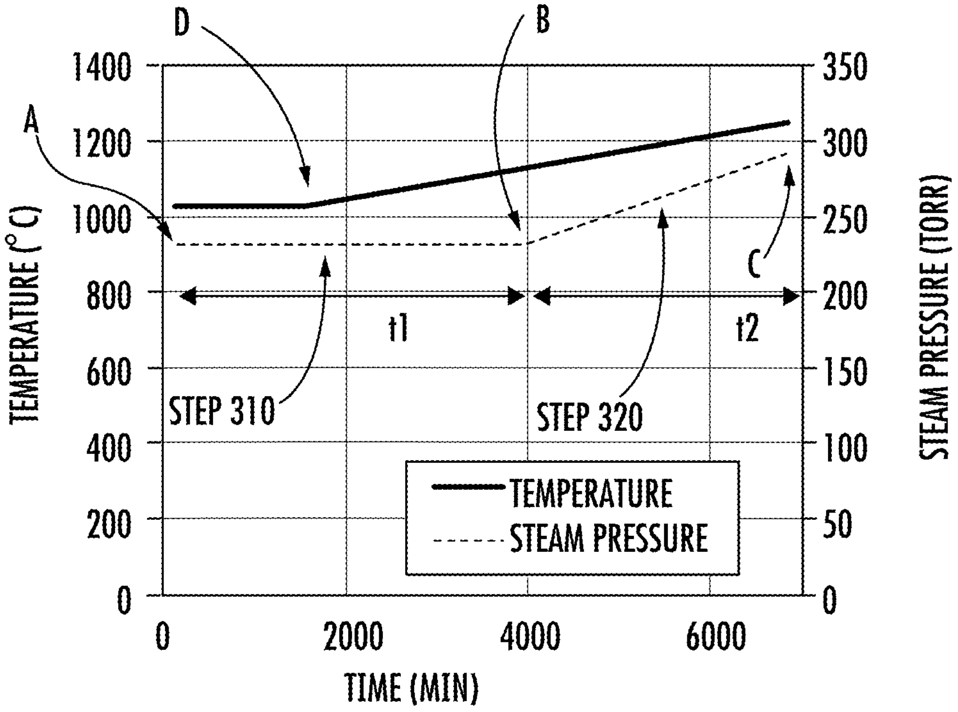
FIG. 4B is a plot of temperature vs. time for another exemplary consolidation process according to the process of FIG. 3.

As also shown in the embodiment of FIG. 4A, the end of the constant steam pressure step (step 310) occurs at the same time as the end of the constant temperature step. FIG. 4B depicts another exemplary embodiment of process 300 of FIG. 3 in which the end of the constant steam pressure step (step 310) occurs after the end of the constant temperature step. In the embodiment of FIG. 4B, the constant steam pressure step extends from point A to point B (as discussed above) and the constant temperature extends from point A to point D, such that point D occurs before point B. Therefore, the duration of the constant temperature at the first temperature T1 is less than the duration of the constant steam pressure at the first partial pressure of steam P1. In the embodiment of FIG. 4B, point B is after the start of the sintering of the glass body.

Figure 4C:
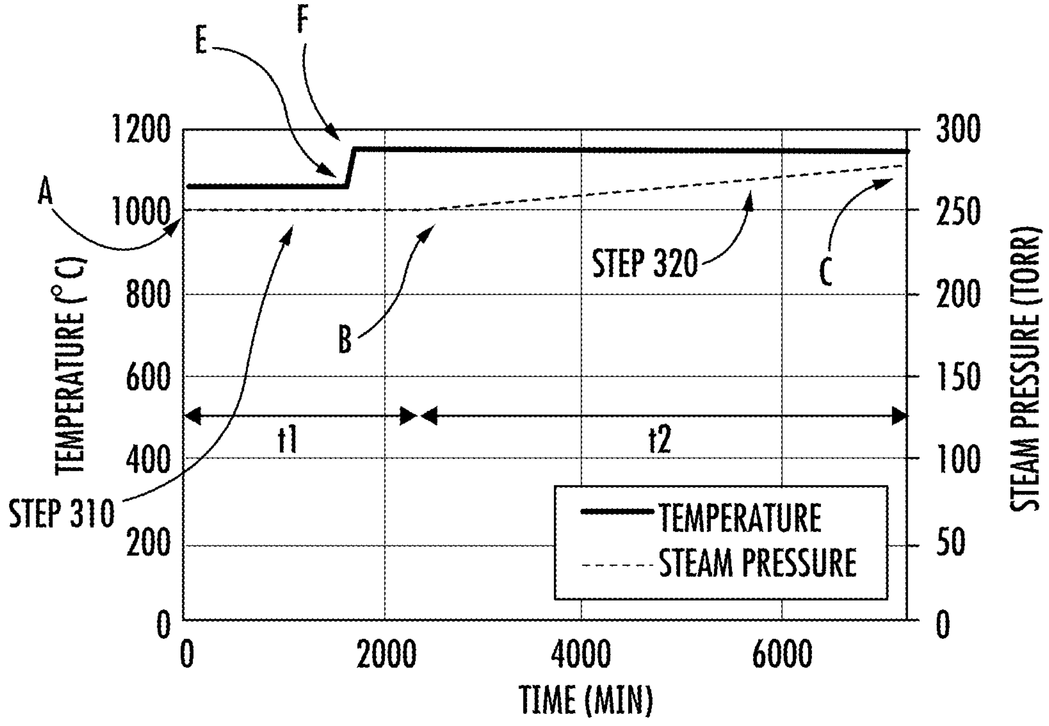
FIG. 4C is a plot of temperature vs. time for another exemplary consolidation process according to the process of FIG. 3.

FIG. 4C depicts another exemplary embodiment of process 300 of FIG. 3 in which the end of the constant steam pressure step (step 310) occurs after the increase in temperature. Therefore, the end of the constant steam pressure step (step 310) occurs when the temperature is constant at the second temperature T2. In particular, in the embodiment of FIG. 4C, the temperature is constant, at the first temperature T1, from point A to point E and then increases from point E to point F to the second temperature T2. The temperature then remains constant at the second temperature T2. As shown in FIG. 4C, the start of the ramp-up steam pressure step, at point B, occurs when the temperature is constant at the second temperature T2. It is also noted that the temperature remains constant at the second temperature T2 for the duration of the ramp-up steam pressure step.

As shown in FIG. 4C, from point to E to point F, the temperature increases from the first temperature T1 to the second temperature T2. The rate of increase may be about 20° C./hour or greater, or about 25° C./hour or greater, or about 30° C./hour or greater, or about 35° C./hour or greater, or about 40° C./hour or greater, or about 45° C./hour or greater, or about 50° C./hour or greater, or about 55° C./hour or greater, or about 60° C./hour or greater, or about 65° C./hour or greater, or about 70° C./hour or greater, or about 75° C./hour or greater, or about 80° C./hour or greater, as also disclosed above. In some embodiments, the increase in temperature from T1 to T2 may be at a rate from about 20° C./hour to about 120° C./hour, or about 30° C./hour to about 100° C./hour, or about 40° C./hour to about 80° C./hour, or about 50° C./hour to about 100° C./hour, or about 50° C./hour to about 80° C./hour. A total time duration from point E to point F may be from about 0.5 hours to 18 hours, or about 1 hour to about 16 hours, or about 1.5 hours to about 14 hours, or about 2 hours to about 12 hours, or about 2.5 hours to about 12 hours, or about 3 hours to about 10 hours, or about 4.5 hours to about 8 hours, or about 5 hours to about 6 hours.

Although FIG. 4C only shows one temperature increase step (from point E to point F), it is also contemplated that the methods disclosed herein may comprise more than one temperature increase step. Therefore, for example, the embodiment of FIG. 4C may comprise a second temperature increase step that occurs during the ramp-up steam pressure step. It is also noted that the temperature increase step(s) disclosed herein may occur during the constant steam pressure step, during the ramp-up steam pressure step, or during both the constant steam pressure and the ramp-up steam pressure steps.

In embodiments, the timing of point B (the start of the ramp-up steam pressure step) is based on the density of the glass body during the consolidation process. In some embodiments, the timing of point B is when the glass body has reached a density of about 50% to about 85% of a target density, the target density being the final density of the glass body after the consolidation process. The timing of point B may be when the glass body has reached a density of about 60% to about 80%, or about 65% to about 75%, or about 70% of the target density. The target density may be from about 1.0 g/cm$^3$ to about 2.6 g/cm$^3$, or about 1.3 g/cm$^3$ to about 2.6 g/cm$^3$, or about 1.3 g/cm$^3$ to about 2.4 g/cm$^3$, or about 1.4 g/cm$^3$ to about 2.2 g/cm$^3$.

Figure 5A:
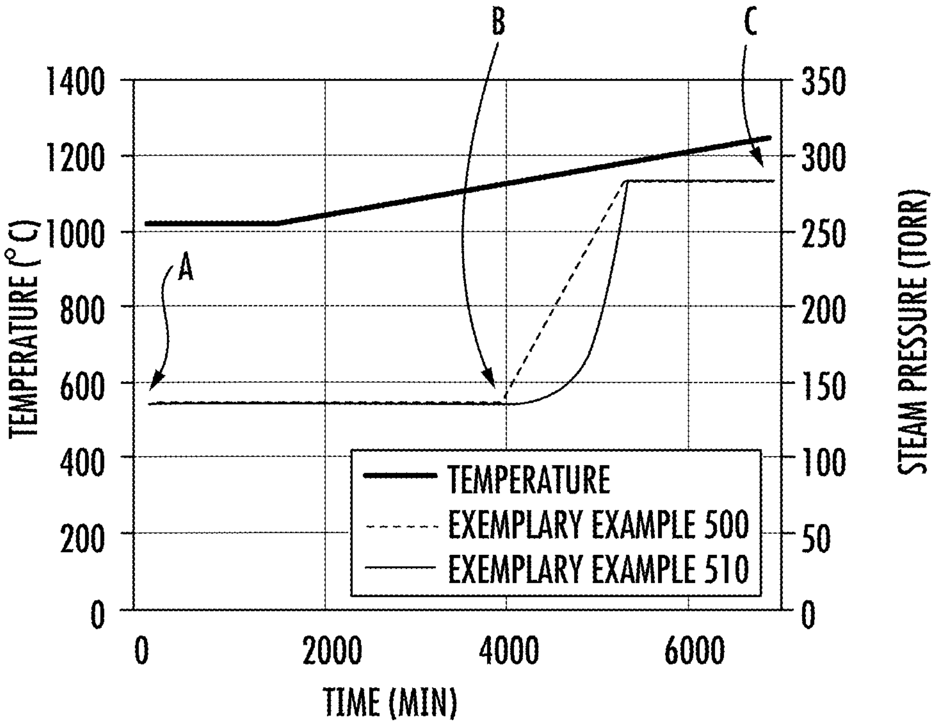
FIG. 5A is a plot of temperature and steam pressure vs. time for exemplary consolidation processes according to the process of FIG. 3.

FIG. 5A depicts two exemplary embodiments showing the difference between linear and nonlinear increase rates during the ramp-up steam pressure step. As shown in FIG. 5A, exemplary example 500 has a linear increase from point B to point C of the ramp-up steam pressure step and exemplary example 510 has a non-linear increase from point B to point C of the ramp-up steam pressure step. Both examples increase from the first partial pressure of steam P1 of 230 Torr at point B to the second partial pressure of steam P2 of 240 Torr at point C. Additionally, in both examples, the glass body was subjected to the same temperature steps, which are also shown in FIG. 5A.

Figure 5B:
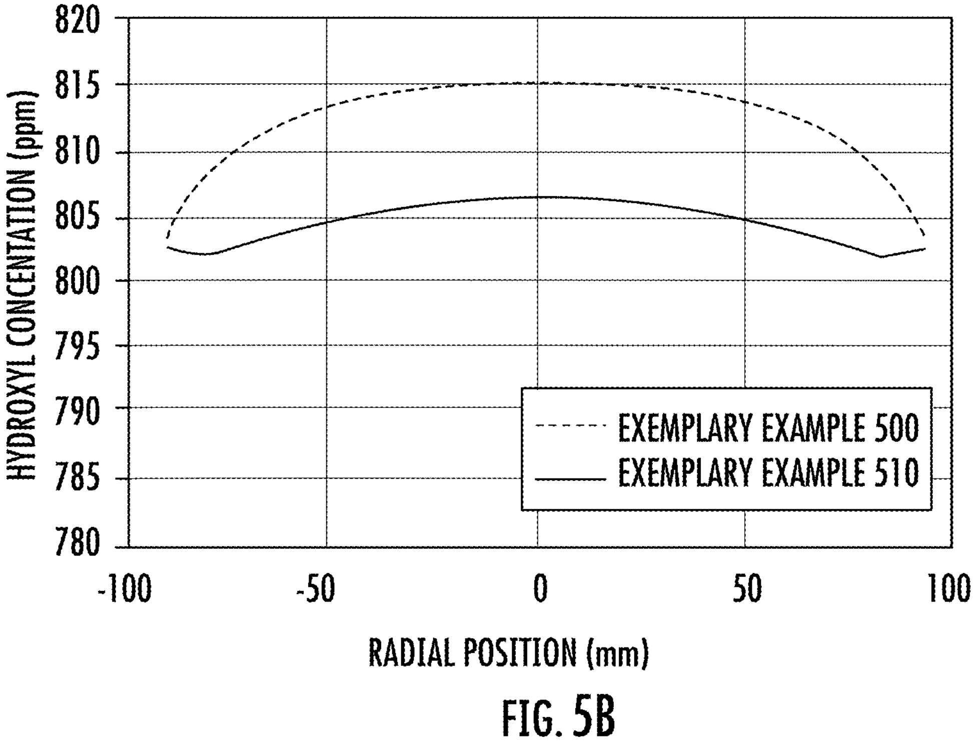
FIG. 5B is a plot of hydroxyl concentration vs. radial position of glass bodies produced with the exemplary consolidation processes of FIG. 5A.

FIG. 5B shows the hydroxyl concentration of the glass body produced by the process of exemplary example 500 and of the glass body produced by the process of exemplary example 510. The hydroxyl concentrations shown in FIG. 5B are across a radial length of the glass bodies. As shown in FIGS. 5A and 5B, the linear pressure increase rate of exemplary example 500 produced an overall higher hydroxyl concentration in the glass body than the nonlinear pressure increase rate of exemplary example 510. However, the nonlinear pressure increase rate of exemplary example 510 produced an overall lower peak-to-valley hydroxyl concentration across the glass body than that of exemplary example 500. This shows that modifying the steam pressure increase rate during the ramp-up steam pressure step (step 320) can impact the hydroxyl concentration in the produced glass body. It is noted that a lower peak-to-valley hydroxyl concentration corresponds to a glass body with a more uniform and even hydroxyl concentration across the glass body, which advantageously allows the body to maintain its figure when subjected to demanding thermal loads.

Figure 6A:
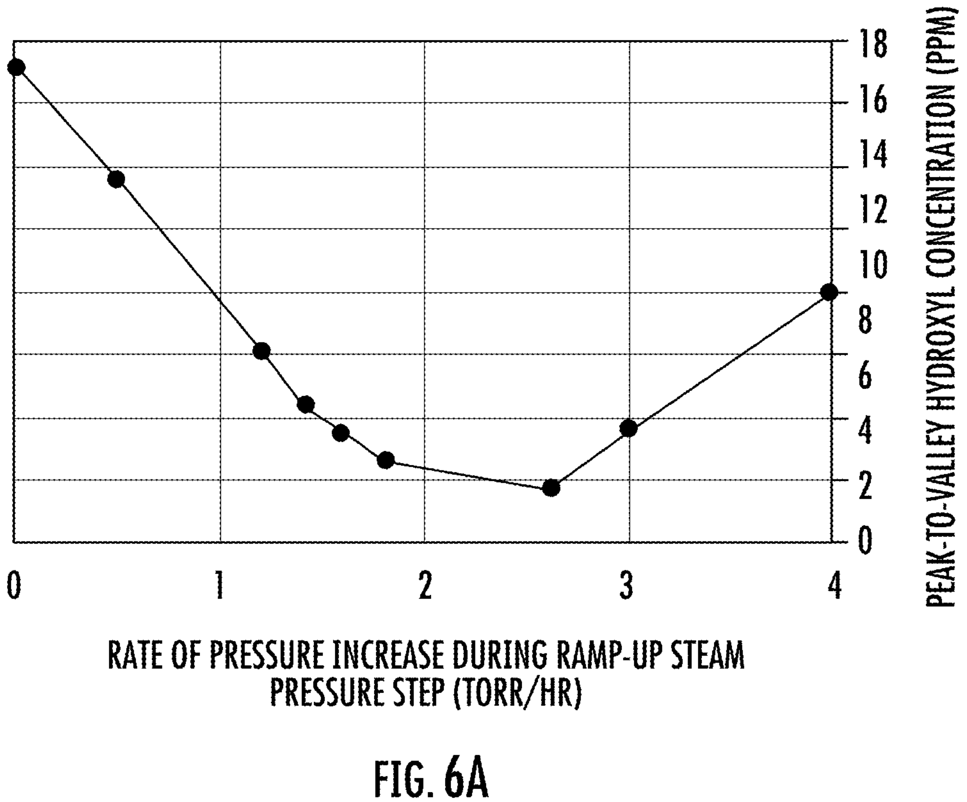
FIG. 6A is a plot of rate of pressure increase vs. peak-to-valley hydroxyl concentration according to the embodiments disclosed herein.

FIG. 6A further shows the relationship between the rate of pressure increase during the ramp-up steam pressure step (step 320) and the peak-to-valley hydroxyl concentration in a glass body. Changing the rate of steam pressure increase during the ramp-up steam pressure step has an impact on the peak-to-valley hydroxyl concentration, with the lowest peak-to-valley hydroxyl concentration being produced with a ramp rate of about 2.6 Torr/hour. This ramp rate produced the low peak-to-valley value of about 2 ppm. A much higher peak-to-valley value of 17 ppm was produced with a constant steam pressure during the ramp-up steam pressure step (a ramp rate of 0 Torr/hour). The decrease in peak-to-valley from 17 ppm to 2 ppm is about a 90% reduction, which shows that the ramp-up steam pressure step has a profound impact on the hydroxyl uniformity in the glass. It is further noted that ramp rates from about 1.5 Torr/hour to about 3 Torr/hour, as shown in FIG. 6A, produced peak-to-valley values within the range of 4 ppm or less, which is about a 75% reduction from the 17 ppm peak-to-valley value.

Figure 6B:
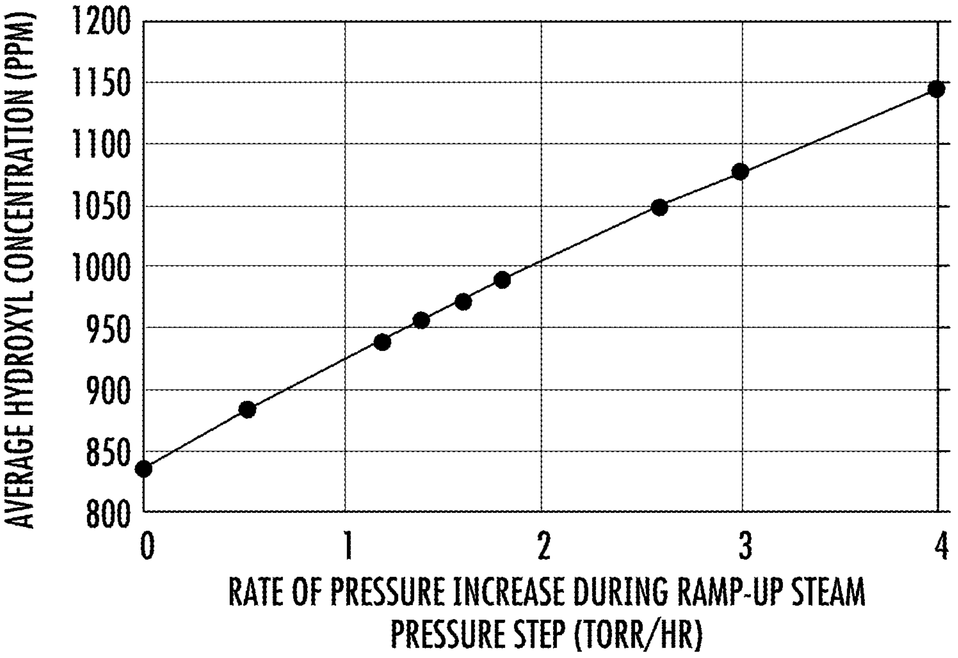
FIG. 6B is a plot of rate of pressure increase vs. average hydroxyl concentration according to the embodiments disclosed herein.

FIG. 6B shows the relationship between the rate of steam pressure increase during the ramp-up steam pressure step (step 320) and the average hydroxyl concentration in a glass body. Changing the rate of steam pressure increase during the ramp-up steam pressure step has an impact on the average hydroxyl concentration, with a higher rate corresponding to a higher average hydroxyl concentration.

Table 1 below provides exemplary examples further illustrating how the rate of steam pressure increase during the ramp-up steam pressure step (step 320) affects the peak-to-valley hydroxyl concentration and the average hydroxyl in a glass body. Additionally, Table 1 below provides a comparative example that does not include the ramp-up steam pressure step. Instead, in the comparative example, the steam pressure is constant during the consolidation of this glass body. All of the exemplary examples in Table 1 along with the comparative example were exposed to the same temperature steps during the consolidation of the glass and follow the embodiment of FIG. 4A in which the end of the constant steam pressure (step 320) coincides in time with the end of the constant temperature step.

TABLE 1

| | Steam Pressure at Start of Ramp-Up Step (Torr) | Rate of Steam Pressure Increase During Ramp-Up Step (Torr/hour) | Peak-to-Valley Hydroxyl Concentration (ppm) | Average Hydroxyl Concentration (ppm) |
|---|---|---|---|---|
| Exemplary Example 1A | 230 | 0.35 | 13 | 832 |
| Exemplary Example 1B | 50 | 3.2 | 18 | 824 |
| Exemplary Example 1C | 1 | 4 | 24 | 833 |
| Comparative Example | 250 | 0 | 17 | 836 |

Figure 7:
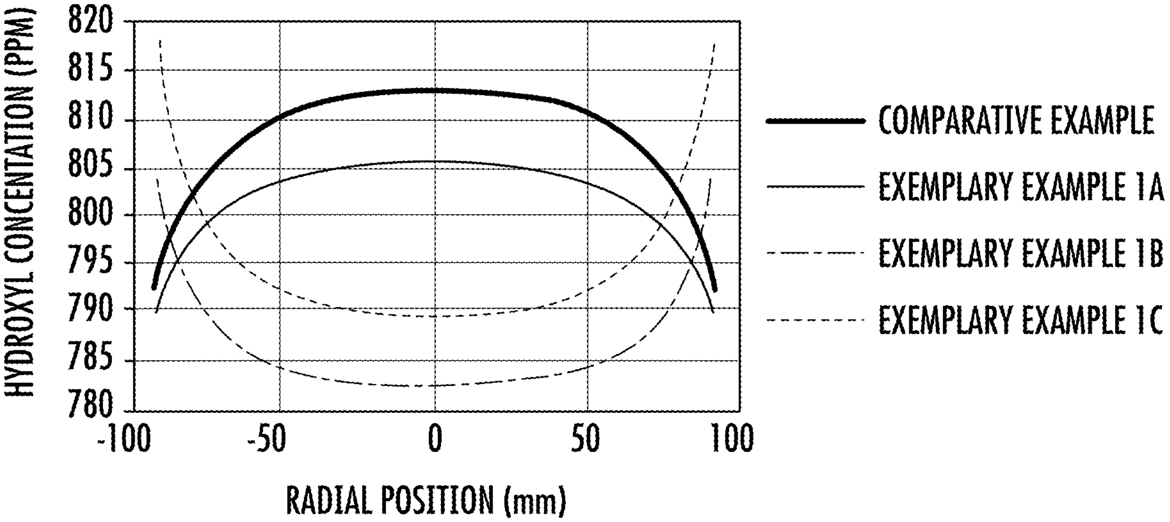
FIG. 7 is a plot of hydroxyl concentration vs. radial position for exemplary examples and a comparative example.

FIG. 7 shows the hydroxyl concentration in the glass bodies of the exemplary examples and the comparative example in Table 1 along the radial length of each glass body. As shown in FIG. 7, changing the rate of steam pressure increase during the ramp-up steam pressure step can alter the location of the peak hydroxyl concentration in the glass body. Exemplary examples 1B and 1C both have relatively higher hydroxyl concentrations at radially outer portions of the glass body and relatively lower hydroxyl concentrations at radially inner portions of the glass body. Thus, the maximum hydroxyl concentration of exemplary examples 1B and 1C is at the radially outer portions of the glass bodies (so that the glass bodies each have a convex hydroxyl concentration profile). In comparison, exemplary example 1A has relatively higher hydroxyl concentrations at radially inner portions of the glass body and relatively lower hydroxyl concentrations at radially outer portions of the glass body. Thus, the maximum hydroxyl concentration of exemplary example A is at the radially central portion of the glass body (so that the glass body has a concave hydroxyl profile). It is also noted that exemplary example 1A has a lower rate of steam pressure increase than either exemplary example 1B or 1C. Furthermore, exemplary example 1C has the highest peak-to-valley concentration of hydroxyl and has the lowest pressure at the start of the ramp-up steam pressure step.

It is also noted that both exemplary example 1A and the comparative example follow the same curved trajectory in FIG. 7, but yet exemplary example 1A has a smaller peak-to-valley hydroxyl concentration than that of the comparative example.

The inventors of the present disclosure discovered that relatively lower rates of steam pressure increase during the ramp-up steam pressure step (step 320) correspond to glass bodies with maximum hydroxyl concentrations at the radially central portion of the glass bodies (i.e., the concave profile discussed above). The inventors of the present disclosure also discovered that relatively higher rates of steam pressure increase during the ramp-up steam pressure step (step 320) correspond to glass bodies with maximum hydroxyl concentrations at the radially outer portions of the glass bodies (i.e., the convex profile discussed above). In embodiments, ramp rates during the ramp-up steam pressure step (the rate of increase from the first partial pressure of steam P1 to the second partial pressure of steam P2) below a threshold ramp rate produce glass bodies with maximum hydroxyl concentrations at the radially central portion of the glass bodies (i.e., the concave profile discussed above). Ramp rates during the ramp-up steam pressure step at or above the threshold ramp rate produce glass bodies with maximum hydroxyl concentrations at the radially outer portions of the glass bodies (i.e., the convex profile discussed above). The threshold ramp rate is dependent on the first partial pressure of steam P1, such that lower first partial pressures of steam P1 will cause the threshold ramp rate to decrease while higher first partial pressures of steam P1 will cause the threshold ramp rate to decrease.

In some exemplary embodiments, the threshold ramp rate is about 2.6 Torr/hour. Therefore, ramp rates during the ramp-up steam pressure step below the threshold ramp rate of about 2.6 Torr/hour produce glass bodies with maximum hydroxyl concentrations at the radially central portion of the glass bodies (i.e., the concave profile discussed above). Ramp rates during the ramp-up steam pressure step at or above the threshold ramp rate of about 2.6 Torr/hour produce glass bodies with maximum hydroxyl concentrations at the radially outer portions of the glass bodies (i.e., the convex profile discussed above). In yet some embodiments, the threshold ramp of about 2.6 Torr/hour is with a first partial pressure of steam P1 of about 250 Torr and a temperature increase of 2.5° C./hour during the ramp-up steam pressure step (such that the temperature and steam pressure increase with the profile according to the embodiment of FIG. 4A). In yet some further embodiments, the threshold ramp rate of about 2.6 Torr/hour is also for a glass body with a diameter of about 10 inches and a height of about 4.5 inches.

In other embodiments, the threshold ramp rate is from about 0.5 Torr/hour to about 4.0 Torr/hour, or about 0.75 Torr/hour to about 3.75 Torr/hour, or about 1.0 Torr/hour to about 3.5 Torr/hour, or about 1.25 Torr/hour to about 3.25 Torr/hour, or about 1.5 Torr/hour to about 3.0 Torr/hour, or about 1.75 Torr/hour to about 2.75 Torr/hour, or about 2.0 Torr/hour to about 3.0 Torr/hour, or about 2.0 Torr/hour to about 2.75 Torr/hour, or about 2.0 Torr/hour to about 2.6 Torr/hour.

Table 2 below provides additional exemplary examples that also illustrate how the rate of steam pressure increase during the ramp-up steam pressure step (step 320) affects the peak-to-valley hydroxyl concentration and the average hydroxyl concentration in a glass body. Table 2 below also includes the same comparative example from Table 1 (with the only change being that the constant steam pressure step ends during the ramp-up temperature step). All of the exemplary examples in Table 1 along with the comparative example were exposed to the same temperature steps during the consolidation of the glass and follow the embodiment of FIG. 4B in which the end of the constant steam pressure (step 320) occurs after the end of the constant temperature step.

TABLE 2

| | Steam Pressure at Start of Ramp-Up Step (Torr) | Rate of Steam Pressure Increase During Ramp-Up Step (Torr/hour) | Start of Steam Pressure Ramp Increase (min) | Peak-to-Valley Hydroxyl Concentration (ppm) | Average Hydroxyl Concentration (ppm) |
|---|---|---|---|---|---|
| Exemplary Example 2A | 230 | 0.35 | 1,566 | 13 | 832 |
| Exemplary Example 2B | 230 | 0.7 | 4,000 | 1 | 833 |
| Comparative Example | 250 | 0 | N/A | 17 | 836 |

Figure 8:
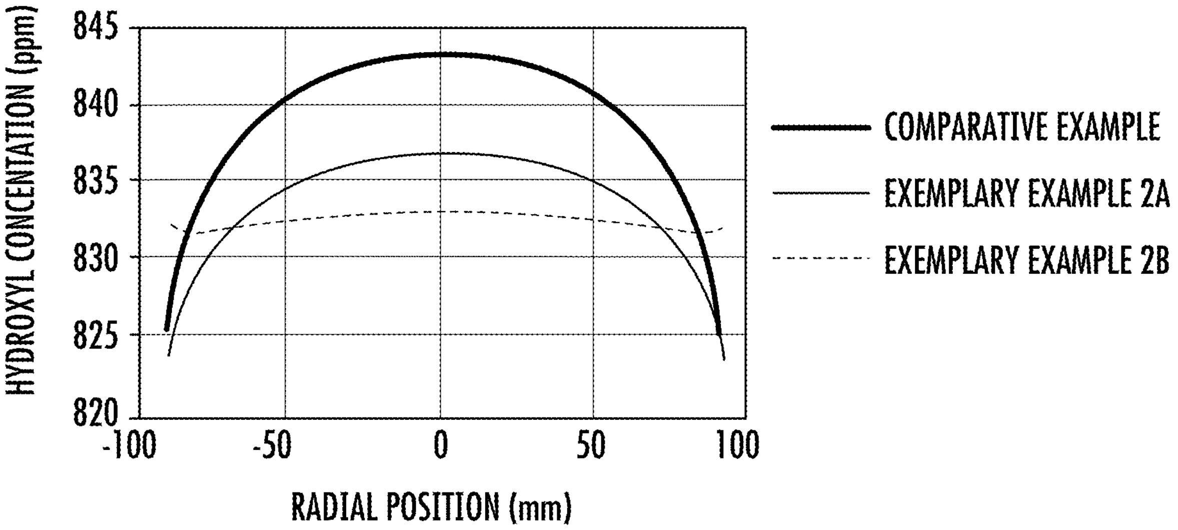
FIG. 8 is another plot of hydroxyl concentration vs. radial position for exemplary examples and a comparative example.

FIG. 8 shows the hydroxyl concentration in the glass bodies of the exemplary examples and of the comparative example in Table 2 along the radial length of each glass body. As shown in FIG. 8, changing the rate of pressure increase during the ramp-up steam pressure step and the time at which the ramp-up steam pressure step starts can alter the peak-to-valley hydroxyl concentration in the glass body. Exemplary example 2A has a higher rate of steam pressure increase during the ramp-up steam pressure step than exemplary example 2B. And the ramp-up steam pressure step of exemplary example 2A starts after that of exemplary example 2B. As shown in Table 2 and FIG. 8, exemplary example 2B has a lower peak-to-valley hydroxyl concentration than that of exemplary example 2A. Furthermore, both exemplary examples 2A and 2B have lower peak-to-valley hydroxyl concentrations than the comparative example. Therefore, Table 2 and FIG. 8 show that the hydroxyl concentration profile in a glass body can be controlled by changing the rate of steam pressure increase and the timing of the start of the ramp-up steam pressure step.

Another exemplary example of the present disclosure, and with reference to FIG. 3, comprises exposing a glass body to the constant steam pressure step (step 310) during which the glass body is exposed to a consolidation furnace that has a first partial pressure of steam (P1) of about 50 Torr and a first temperature (T1) of about 1030° C. The consolidation furnace is maintained at this partial steam pressure and temperature for a duration (t1) of 153 minutes. In this exemplary embodiment, the end of the constant steam pressure (step 310) coincides with the end of the constant temperature. Next, both the steam pressure and temperature are increased together. In this embodiment, the glass body is exposed to a ramp-up steam pressure step (step 320) during which the partial steam pressure within the consolidation furnace is increased from about 50 torr (P1) to about 402 Torr (P2) at a rate of 4 Torr/hour. The temperature of the consolidation furnace is also increased from about 1030° C. (T1) to about 1250° C. (T2) at a rate of 2.5° C./hour. The duration (t2) of the ramp-up steam pressure step is 5280 minutes.

Figure 9A:
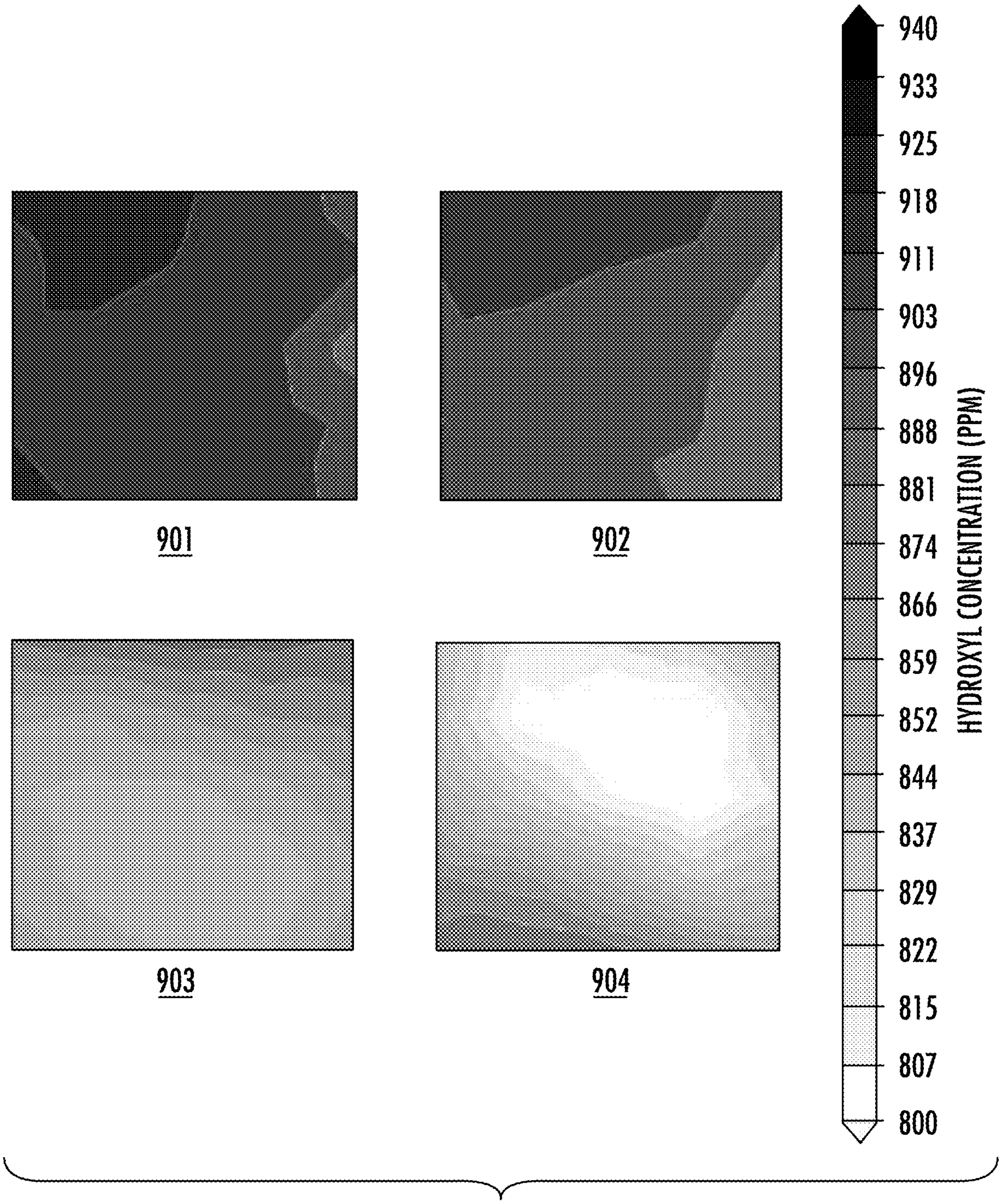

FIGS. 9A-9C show exemplary plots of the distribution of hydroxyl concentration in three glass bodies produced by the exemplary methods disclosed herein. In particular, FIG. 9A shows four samples (901, 902, 903, 904) sliced from the same glass body. As shown in FIG. 9A, the four samples each have a uniform hydroxyl concentration along the length and width of the sample, with very little difference in concentration. Sample 901 has a peak-to-valley hydroxyl concentration of 26 ppm, sample 902 has a peak-to-valley hydroxyl concentration of 23 ppm, sample 903 has a peak-to-valley hydroxyl concentration of 49 ppm, and sample 904 has a peak-to-valley hydroxyl concentration of 96 ppm. FIG. 9B shows one sample (905) sliced from a glass body. Sample 905 has a peak-to-valley hydroxyl concentration of 68 ppm. FIG. 9C shows two samples (906, 907) sliced from the same glass body. Sample 906 has a peak-to-valley hydroxyl concentration of 14 ppm, and sample 907 has a peak-to-valley hydroxyl concentration of 22 ppm. Furthermore, samples 904 and 905 have relatively lower hydroxyl concentrations at radially central portions of the samples. Samples 901, 902, 906, and 907 have relatively uniform hydroxyl concentrations along the samples. The samples of FIGS. 9A-9C show that the exemplary methods disclosed herein produce glass bodies with very low peak-to-valley hydroxyl concentrations.

Figure 10A:
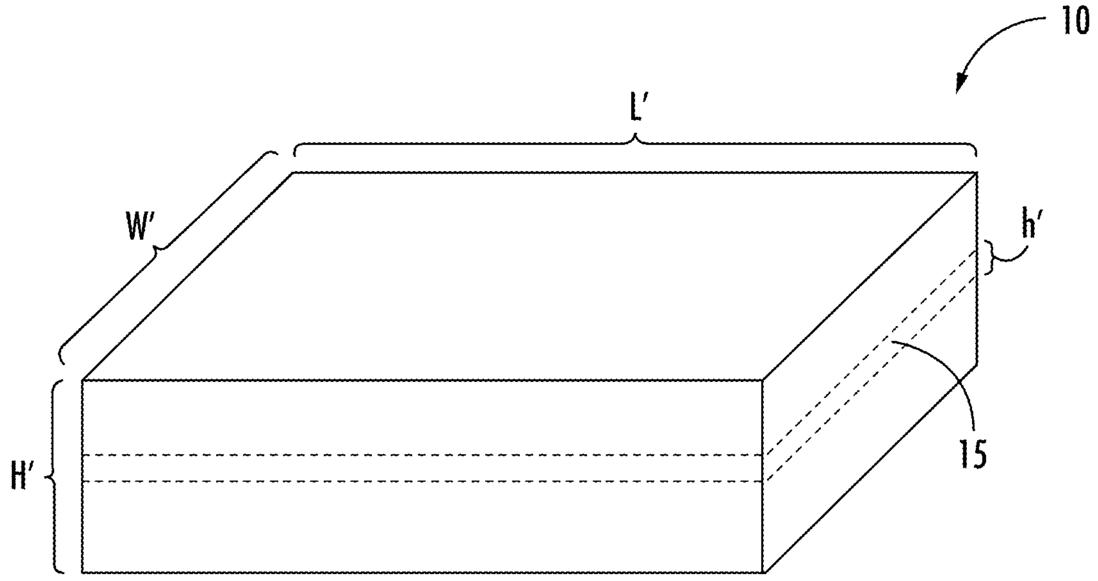
FIG. 10A shows an exemplary glass body, according to embodiments disclosed herein.

For purposes of the present disclosure, the hydroxyl concentrations were measured by segmenting the glass body into a plurality of segments and measuring the hydroxyl concentration of each segment, as discussed below with reference to FIGS. 10A through 10C. FIG. 10A shows a glass body 10 produced by the process 100 of FIG. 1 with the exemplary consolidation process 300 of FIG. 3. Thus, body 10 is the resultant body after the annealing step 140 of process 100. Body 10 may be an ingot or a substrate to which one or more layers are applied in downstream processing.

As discussed above, body 10 is titania-doped silica glass. The silica concentration in body 10 may be about 80 wt. % or more, or about 85 wt. % or more, or about 90 wt. % or more, or about 92 wt. % or more, or about 95 wt. % or more, or about 97 wt. % or more, or about 98 wt. % or more, or about 99 wt. % or more, or from about 85 wt. % to about 97 wt. %, or from about 90 wt. % to about 95 wt. %. The titania concentration in body 10 may be from about 1.0 wt. % to about 15.0 wt. %, or from about 6.0 wt. % to about 12.0 wt. %, or from about 6.0 wt. % to about 8.5 wt. %, or from about 6.5 wt. % to about 8.0 wt. %, or from about 7.0 wt. % to about 7.7 wt. %, or from about 6.5 wt. % to about 7.8 wt. %.

Body 10 has a length L', a width W', and a height H', as shown in FIG. 10A. In some embodiments, each of the length L' and the width W is greater than the height H'. For example, the length L' and the width W' may each be about 500 mm or less, or about 450 mm or less, or about 400 mm or less, or about 350 mm or less, or about 300 mm or less, or about 250 mm or less, or about 200 mm or less, or about 150 mm or less, or about 100 mm or less, or about 75 mm or less, or about 50 mm or less, or about 25 mm or less, or about 20 mm or less, or about 15 mm or less. Additionally or alternatively the length L' and width W' of glass body 10 are each about 15 mm or greater, or about 20 mm or greater, or about 25 mm or greater, or about 50 mm or greater, or about 75 mm or greater, or about 100 mm or greater, or about 150 mm or greater, or about 200 mm or greater, or about 250 mm or greater, or about 300 mm or greater, or about 350 mm or greater, or about 400 mm or greater, or about 450 mm or greater, or about 500 mm or greater. In some embodiments, both the length L' and the width W' are about 150 mm, or about 152 mm, or about 179 mm. However, it is also contemplated that the length L' can be different from the width in some embodiments.

Furthermore, the height H' may be smaller than each of the length L' and the width W'. In some embodiments, the height H' is about 400 mm or less, or about 350 mm or less, or about 300 mm or less, or about 250 mm or less, or about 200 mm or less, or about 150 mm or less, or about 100 mm or less, or about 75 mm or less, or about 50 mm or less, or about 25 mm or less, or about 20 mm or less, or about 15 mm or less, or about 10 mm or less, or about 5 mm or less. Additionally or alternatively, the height H' is about 5 mm or greater, or about 10 mm or greater, or about 15 mm or greater, or about 20 mm or greater, or about 25 mm or greater, or about 50 mm or greater, or about 75 mm or greater, or about 100 mm or greater, or about 150 mm or greater, or about 200 mm or greater, or about 250 mm or greater, or about 300 mm or greater, or about 350 mm or greater, or about 400 mm or greater. In some embodiments, the height H' is about 63 mm, or about 150 mm, or about 152 mm.

As also discussed above, body 10 may be sliced into a plurality of samples. FIG. 10A shows an exemplary sample 15 of body 10 that forms a sub-portion of the body along the smallest dimension (i.e., the characteristic length Lc) of body 10. Each sample 15 may also be considered to be a body or a substrate or a wafer. In the embodiment of FIG. 10A, the height H' is less than each of the length L' and the width W' so that the height H' is the smallest dimension. Thus, the height h' of sample 15 extends along the height H' of body 10. In the embodiment of FIG. 10A, body 10 comprises multiple samples along its height H'. However, it is also contemplated in other embodiments, that one sample 15 extends along the entire height H' of body 10 (or along the entire smallest dimension of body if the smallest dimension is not the height H'). In these embodiments, body 10 only comprises one sample 15 such that the one sample 15 forms the entire body 10.

Although FIG. 10A depicts body 10 and sample 15 as being square components with flat surfaces, it is also contemplated in embodiments that body 10 and/or sample 15 comprise other shapes. For example, the outer profile of body 10 and/or sample 15 can be circular or elliptical or a non-symmetrical shape. Furthermore, body 10 and/or sample 15 can be curved forming a concave or convex structure. In one exemplary embodiment, body 10 is formed of a single sample 15 (such that the single sample 15 extends for the entire length, width, and height of body 10) and body 10 has a concave structure. Sample 15 may be a reticle, photomask, mirror, and/or a photomask holder.

Each sample 15 has substantially uniform hydroxyl and titania concentrations across the length and width of the sample. In order to determine the uniformity of the samples in a body, each sample is divided into segments across the length and width of the sample. For example, FIG. 10B shows sample 15 divided into segments 20 across the cross-sectional length L' and width W' of sample 15. The concentration of one or more components (e.g., hydroxyl, titania) may be then determined for each segment 20 in order to determine the uniformity of each of these components along sample 15. For example, the concentration of hydroxyl may be measured for each segment 20 in order to determine the hydroxyl concentration uniformity across the cross-section of sample 15. As discussed further below, the concentration of the one or more components is determined through the full thickness h' of each segment 20.

Figure 10B:
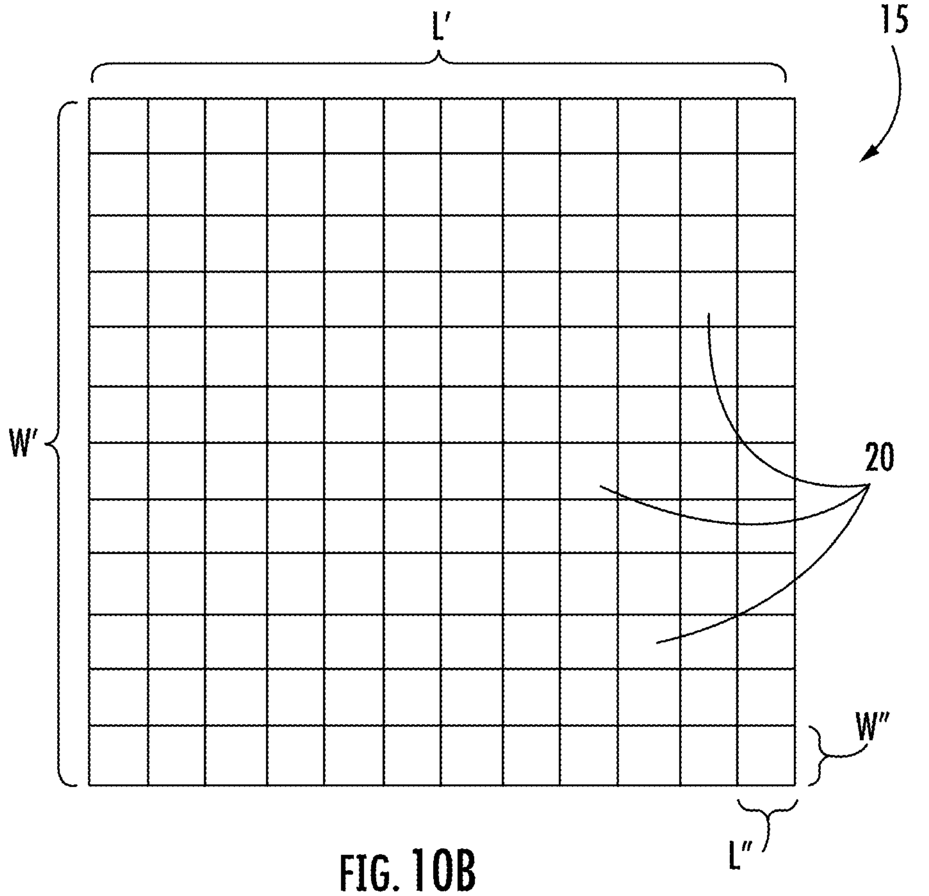
FIG. 10B shows a cross-section of a sample of the glass body of FIG. 10A, according to embodiments disclosed herein.
Figure 10C:
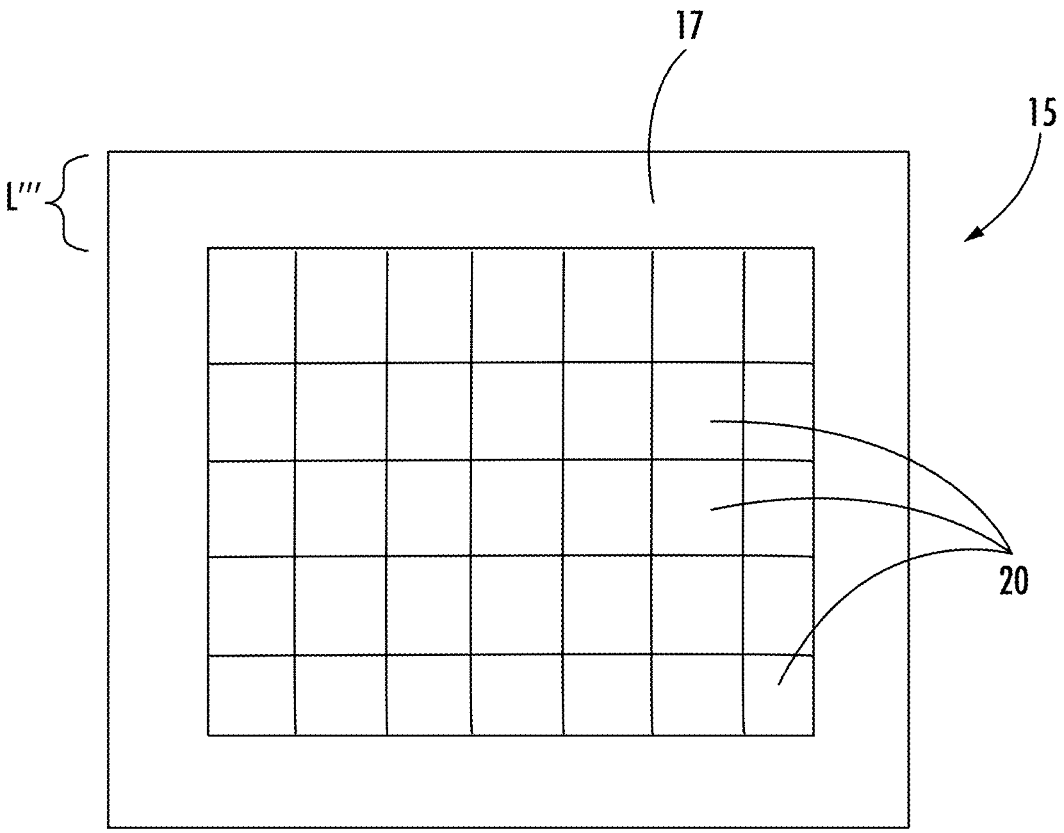
FIG. 10C shows another cross-section of a sample of the glass body of FIG. 10A with an outer, peripheral lip, according to embodiments disclosed herein.

Although FIG. 10B shows segments 20 as extending along the entire length L' and width W' of sample 15, it is also contemplated that the portion of sample 15 that comprises segments 20 may be less than the entire cross-sectional length L' and width W'. For example, as shown in FIG. 10C, sample 15 may comprise an outer, peripheral lip 17 upon which segments 20 are not formed. Therefore, outer, peripheral lip 17 may be a clearance between the end of segments 20 and the outer edge of sample 15. In embodiments, the outer, peripheral lip may extend for a length L''' from about 2 mm to about 20 mm, or about 4 mm to about 16 mm, or about 5 mm to about 16 mm, or about 8 mm to about 14 mm, or about 10 mm to about 12 mm. In some embodiments, the length L''' is about 12.5 mm or about 12.7 mm.

Segments 20 may be adjacent segments across a specific length and width of sample 15 (such that no gaps are formed between the adjacent segments). As discussed above, this specific length and width (across which all the segments 20 extend) may be equal to or less than the length L' and width W' of sample 15. In embodiments, segments 20 are adjacent segments across a length and width (across which all the segments 20 extend) of sample 15 such that the length and width are each about 25 mm or greater, or about 30 mm or greater, or about 40 mm or greater or about 50 mm or greater, or about 60 mm or greater, or about 75 mm or greater, or about 100 mm or greater, or about 125 mm or greater, or about 150 mm or greater, or about 175 mm or greater, or about 180 mm or greater, or about 190 mm or greater, or about 200 mm or greater, or about 250 mm or greater.

When sample 15 comprises a flat surface, segments 20 are formed along the flat planar surface, as shown in FIG. 10B. However, when sample 15 comprises a concave or convex surface, segments 20 are formed along the curving surface of sample 15.

As shown in FIG. 10B, each segment 20 has a length L' and a width W'' that are each about 12.7 mm. However, it is also contemplated in other embodiments that the length L'' is not equal to the width W''. It is also noted that in some embodiments, the length L'' and the width W'' of segments 20 may be equal to the length L''' of peripheral lip 17.

The height of each segment 20 is the height h' of sample 15, as discussed above. Therefore, in embodiments, the height h' is about 7.62 mm.

As discussed above, the concentration of one or more components may be determined within each segment 20. Therefore, for example, the concentration of hydroxyl may be determined for each adjacent segment 20 within sample 15. When each segment 20 has a length and width of 12.7 mm, the concentration of the components is determined at a frequency of 12.7 mm across the cross-section of sample 15. For example, the concentration of hydroxyl is measured at a frequency of 12.7 mm across the cross-section of sample 15.

The concentration of hydroxyl for each segment 20 is measured using Fourier transform infrared spectroscopy ("FTIR") in transmission. As used herein, "in transmission" means that the light is directed through the glass body to be measured to determine the hydroxyl concentration (rather than using light that is reflected from the body to be measured to determine the hydroxyl concentration). Therefore, "in transmission" requires a non-scattering surface. Once sample 15 is loaded into the FTIR for measurement, a beam alignment and background measurement may be performed first. Then the FTIR measures the fundamental absorption peak for hydroxyl, which measures the peak height with respect to the background signal, the background signal being a straight line between the points surrounding the absorption peak. The absorption peak height is then divided by the thickness h' of sample 15 to yield an absorption coefficient $\beta_{OH}$. The hydroxyl concentration is then derived from the absorption coefficient $\beta_{OH}$ using the equation:

$$C=\beta_{OH}/\varepsilon\times MW_{OH}/D_{glass}\times 106$$

where C is the concentration of hydroxyl in ppm for a particular segment 20, $\beta_{OH}$ is the absorption coefficient of the glass, ε is the molar absorptivity of hydroxyl for the absorption peak at a wavenumber of 3670 $cm^{-1}$, $MW_{OH}$ is the molecular weight of hydroxyl (g/mol), and $D_{glass}$ is the density of hydroxyl ($g/cm^3$). The above-disclosed FTIR analysis is further disclosed in K. M. Davis, et al, "Quantitative infrared spectroscopic measurement of hydroxyl concentration in silica glass," J. Non-Crystalline Solids, 203 (1996) 27-36, which is incorporated by reference herein. As discussed above, the hydroxyl concentration is measured for each segment 20 of sample 15 and is measured through the full thickness h' of each segment 20. The hydroxyl concentration measurement is then repeated over all segments 20 of sample 15.

One or more segments 20 may have a different concentration of hydroxyl from one or more other segments 20. However, in embodiments, segments 20 each have substantially the same concentration of hydroxyl regardless of where the segment is located on substate 10.

Furthermore, an average hydroxyl concentration along the length L' and width' of sample 15 may be determined by averaging together the hydroxyl concentrations of the individual segments 20. According to the embodiments disclosed herein, the average hydroxyl concentration of the entirety of sample 15 may be in a range from about 0 ppm to about 2000 ppm, or about 200 ppm to about 1900 ppm, or about 300 ppm to about 1800 ppm, or about 400 ppm to about 1700 ppm, or about 500 ppm to about 1750 ppm, or about 600 ppm to about 1600 ppm, or about 700 ppm to about 1500 ppm, or about 800 ppm to about 1400 ppm, or about 900 ppm to about 1300 ppm, or about 1000 ppm to about 1200 ppm, or about 1000 ppm to about 1100 ppm, or about 600 ppm to about 1500 ppm, or about 600 ppm to about 1400 ppm, or about 600 ppm to about 1300 ppm, or about 700 ppm to about 1000 ppm, or about 50 ppm to about 200 ppm, or about 75 ppm to about 150 ppm, or about 80 ppm to about 125 ppm. In some embodiments, the average hydroxyl concentration of the entirety of sample 15 is about 400 ppm or less, or about 350 ppm or less, or about 300 ppm or less, or about 250 ppm or less, or about 200 ppm or less, or about 150 ppm or less, or about 100 ppm or less, or about 90 ppm or less, or about 80 ppm or less, or about 75 ppm or less, or about 70 ppm or less, or about 60 ppm or less, or about 50 ppm or less.

In some particular embodiments, the maximum hydroxyl concentration among segments 20 may be in a range from about 1000 ppm to about 1400 ppm, or from about 1000 ppm to about 1300 ppm, or from about 1000 ppm to about 1200 ppm, or from about 1000 ppm to about 1100 ppm, or from about 1050 ppm to about 1100 ppm, or from about 1060 ppm to about 1090 ppm. The minimum hydroxyl concentration among segments 20, in some particular embodiments, may be in a range from about 600 ppm to about 1300 ppm, or from about 800 ppm to about 1200 ppm, or from about 900 ppm to about 1100 ppm, or from about 1000 ppm to about 1100 ppm, or from about 1050 ppm to about 1100 ppm, or from about 1060 ppm to about 1080 ppm, or from about 100 ppm to about 500 ppm, or from about 200 ppm to about 400 ppm.

The difference between the highest average concentration and the lowest average concentration of hydroxyl among the different segments 20 is the peak-to-valley hydroxyl concentration. More specifically, the segment 20 with the highest hydroxyl concentration is compared with the segment 20 with the lowest hydroxyl concentration. Then, the difference between the highest and lowest hydroxyl concentrations is calculated. This difference between the highest concentration and the lowest concentration in a sample 15 is referred to as the peak-to-valley difference in concentration. The lower the peak-to-valley difference, the more uniform the concentration is in a particular sample.

The peak-to-valley difference of hydroxyl concentration of segments 20 in sample 15, when produced with the consolidation comprising process 300, may be about 70 ppm or less, or about 60 ppm or less, or about 55 ppm or less, or about 50 ppm or less, or about 45 ppm or less, or about 40 ppm or less, or about 35 ppm or less, or about 30 ppm or less, or about 25 ppm or less, or about 20 ppm or less, or about 15 ppm or less, or about 10 ppm or less, or about 5.0 ppm or less, or about 2.5 ppm or less, or about 1.0 ppm or less, or about 0.0 ppm. Additionally or alternatively, the peak-to-valley difference of hydroxyl concentration of segments 20, when produced with the consolidation comprising process 300, may be about 0.0 ppm or greater, or about 1.0 ppm or greater, or about 2.5 ppm or greater, or about 5.0 ppm or greater, or about 10 ppm or greater, or about 15 ppm or greater, or about 20 ppm or greater, or about 25 ppm or greater, or about 30 ppm or greater, or about 35 ppm or greater, or about 40 ppm or greater, or about 45 ppm or greater, or about 50 ppm or greater. In some embodiments, the peak-to-valley difference of average hydroxyl concentration of segments 20 is within a range of about 0.0 ppm to about 60 ppm, or about 10 ppm to about 50 ppm, or about 15 ppm to about 45 ppm, or about 20 ppm to about 40 ppm, or about 10 ppm to about 30 ppm.

As discussed above, the peak-to-valley difference of hydroxyl concentration amongst segments 20 is very low, thus providing a homogenous and uniform glass body 10. Due to such low peak-to-valley differences, glass body 10 will maintain its figure in an EUV system. It is noted that the embodiments of the present disclose comprise the above-disclosed peak-to-valley ranges at varying maximum and average hydroxyl concentrations. Therefore, for example, the above-disclosed peak-to-valley ranges may be in embodiments with relatively high hydroxyl concentrations and in embodiments with relatively low hydroxyl concentrations.

The peak-to-valley difference of titania concentration of segments 20 in sample 15, when produced with the consolidation comprising process 300, may be about 0.0100 wt. % or less, or about 0.0090 wt. % or less, or about 0.0080 wt. % or less, or about 0.0070 wt. % or less, or about 0.0060 wt. % or less, or about 0050 wt. % or less, or about 0.0040 wt. % or less, or about 0.0035 wt. % or less, or about 0.0030 wt. % or less, or about 0.0025 wt. % or less, or about 0.0020 wt. % or less, or about 0.0015 wt. % or less, or about 0.0010 wt. % or less. In embodiments, the peak-to-valley difference of titania concentration of segments 20 is in range from about 0.0010 wt. % to about 0.0050 wt. %, or about 0.0015 wt. % to about 0.0045 wt. %, or about 0.0020 wt. % to about 0.0040 wt. %, or about 0.0025 wt. % to about 0.0035 wt. %, or about 0.0030 wt. % to about 0.0050 wt. %, or about 0.0010 wt. % to about 0.0030 wt. %, or about 0.0010 wt. % to about 0.0025 wt. %, or about 0.0010 wt. % to about 0.0020 wt. %.

The peak-to-valley difference of titania concentration in glass body 10 is very low, thus providing a homogenous glass body 10 with not only a uniform concentration of hydroxyl but also of titania.

The concentration of titania of each segment 20 is calculated based upon the measured refractive index of each segment 20. As in well-known in the art, the concentration of titania in a glass body correlates to the refractive index of the glass body. Therefore, for purposes of the present disclosure, refractive index is measured in order to determine the titania concentration of the glass bodies disclosed herein. More specifically, an optical interferometer operating at a wavelength of 633 nm is used to measure the refractive index. In particular, the optical interferometer is a Zygo Verifire HD from Zygo Corporation with a 270 micron pixel size resolution and operating at a wavelength of 633 nm. The optical interferometer is set so that the pixels are square with a size of 270 microns×270 microns, and each pixel extends through the full thickness h' of sample 15. The refractive index is measured at each pixel within a segment 20 and through the full thickness of the pixel. The refractive indexes, which were each measured for each pixel within a segment 20, are then averaged together to determine the average refractive index of each segment 20. The refractive index measurement is then repeated over all segments 20 of sample 15.

According to aspects, a process of forming a titania-silica glass body, the process comprising: exposing a titania-doped silica soot body to a constant steam pressure step during which the partial steam pressure is at a first partial pressure of steam P1 that is from about 0 Torr to about 760 Torr; exposing the soot body to a ramp-up steam pressure step during which the partial steam pressure increases from the first partial pressure of steam P1 to a second partial pressure of steam P2, the second partial pressure of steam P2 being from about 50 Torr to about 760 Torr, the second partial pressure of steam P2 being greater than the first partial pressure of steam P1; heating the soot body during the constant steam pressure step and during the ramp-up steam pressure step; and increasing the temperature during at least one of the constant steam pressure step and the ramp-up steam pressure step.

According to aspects, further comprising annealing the soot body after heating the soot body, wherein after the annealing, a peak-to-valley difference of hydroxyl concentration amongst a plurality of segments of the body is about 70 ppm or less, the hydroxyl concentration being measured using a Fourier transform infrared spectroscopy in transmission, and the plurality of segments including every adjacent segment across a length and a width of the body, the length being about 25 mm or more and the width being about 25 mm or more.

According to aspects, wherein the peak-to-valley difference of hydroxyl concentration is about 60 ppm or less.

According to aspects, wherein the peak-to-valley difference of hydroxyl concentration is about 50 ppm or less.

According to aspects, wherein the length is about 50 mm or more and the width is about 50 mm or more.

According to aspects, wherein the length is about 100 mm or more and the width is about 100 mm or more.

According to aspects, wherein the average hydroxyl concentration of the plurality of segments is about 1500 ppm or less.

According to aspects, wherein the average hydroxyl concentration of the plurality of segments is about 400 ppm or less.

According to aspects, wherein the average hydroxyl concentration of the plurality of segments is about 200 ppm or less.

According to aspects, wherein, after the annealing, a peak-to-valley difference of titania concentration amongst the plurality of segments of the body is about 0.0100 wt. % or less.

According to aspects, wherein the first partial pressure of steam P1 is about 5 Torr to about 300 Torr.

According to aspects, wherein the second partial pressure of steam P2 is about 200 Torr to about 700 Torr.

According to aspects, wherein the temperature is increased during at least the ramp-up steam pressure step.

According to aspects, wherein the temperature is increased during at least the constant steam pressure step.

According to aspects, wherein a time duration of the ramp-up steam pressure step is greater than a time duration of the constant steam pressure step.

According to aspects, wherein a rate of steam pressure increase during the ramp-up steam pressure step is linear.

According to aspects, wherein a rate of steam pressure increase during the ramp-up steam pressure step is nonlinear.

According to aspects, wherein a rate of steam pressure increase during the ramp-up steam pressure step is about 0.1 Torr/hour to about 10 Torr/hour.

According to aspects, wherein the rate of steam pressure increase during the ramp-up steam pressure step is about 0.2 Torr/hour, to about 8 Torr/hour.

According to aspects, wherein heating the soot body during the constant steam pressure step comprises heating the soot body at a constant temperature T1.

According to aspects, wherein increasing the temperature begins at the start of the ramp-up steam pressure step.

According to aspects, wherein increasing the temperature begins before the start of the ramp-up steam pressure step.

According to aspects, wherein increasing the temperature comprises exposing the soot body to a temperature from about 1050° C. to about 1250° C.

According to aspects, wherein the temperature is from about 1100° C. to about 1200° C.

According to aspects, wherein, after the ramp-up steam pressure step, the body has a silica concentration of about 80 wt. % or more.

According to aspects, wherein after the ramp-up steam pressure step, the body has a titania concentration from about 6.0 wt. % to about 12.0 wt. %.

According to aspects, further comprising pressing the titania-doped silica soot into a mold.

According to aspects, wherein the glass body is a photomask.

According to aspects, a process of forming a titania-silica glass body, the process comprising: exposing a titania-doped silica soot body to a constant steam pressure step during which the partial pressure of steam is at a first partial pressure of steam P1 that is from about 0 Torr to about 760 Torr; exposing the soot body to a ramp-up steam pressure step during which the partial pressure of steam increases from the first partial pressure of steam P1 to a second partial pressure of steam P2, the second partial pressure of steam P2 being from about 50 Torr to about 760 Torr, the second partial pressure of steam P2 being greater than the first partial pressure of steam P1, and the rate of increase from the first partial pressure of steam P1 to the second partial pressure of steam P2 being from about 0.1 Torr/hour to about 10 Torr/hour; and heating the soot body during the constant steam pressure step and during the ramp-up steam pressure step.

According to aspects, wherein the rate is about 0.3 Torr/hour to about 6 Torr/hour.

According to aspects, wherein the rate is about 1.5 Torr/hour to about 3 Torr/hour.

According to aspects, wherein the first partial pressure of steam P1 is maintained at a constant steam pressure with the steam pressure varying by about 5° C. or less.

According to aspects, wherein the glass body is a photomask.

According to aspects, wherein heating the soot body comprises exposing the soot body to a temperature from about 1050° C. to about 1250° C.

According to aspects, wherein the temperature is from about 1100° C. to about 1200° C.

According to aspects, a process of forming a titania-silica glass body, the process comprising: exposing a titania-doped silica soot body to a constant steam pressure step during which the partial pressure of steam is at a first partial pressure of steam P1; and exposing the soot body to a ramp-up steam pressure step during which the partial pressure of steam increases from the first partial pressure of steam P1 to a second partial pressure of steam P2, the second partial pressure of steam P2 being greater than the first partial pressure of steam P1, the rate of increase from the first partial pressure of steam P1 to the second partial pressure of steam P2 being greater than or equal to a threshold ramp rate, and radially outer portions of the titania-silica glass body having relatively higher concentrations of hydroxyl than a radially central portion of the titania-silica glass body.

According to aspects, wherein the threshold ramp rate is about 0.5 Torr/hour to about 4.0 Torr/hour.

According to aspects, wherein the threshold ramp rate is about 1.0 Torr/hour to about 3.5 Torr/hour.

According to aspects, wherein the threshold ramp rate is about 2.6 Torr/hour.

According to aspects, wherein the first partial pressure of steam P1 is about 0 Torr to about 760 Torr and the second partial pressure of steam P2 is about 50 Torr to about 760 Torr.

According to aspects, wherein the first partial pressure of steam P1 is maintained at a constant steam pressure with the steam pressure varying by about 5° C. or less.

According to aspects, wherein the glass body is a photomask.

It will be apparent to those skilled in the art that various modifications and variations can be made to embodiments of the present disclosure without departing from the spirit and scope of the disclosure. Thus, it is intended that the present disclosure cover such modifications and variations provided they come within the scope of the appended claims and their equivalents.

What is claimed is:

1. A process of forming a titania-silica glass body, the process comprising:

exposing a titania-doped silica soot body to a constant steam pressure step during which the partial pressure of steam is at a first partial pressure of steam P1 that is from about 5 Torr to about 760 Torr;

exposing the soot body to a ramp-up steam pressure step during which the partial pressure of steam increases from the first partial pressure of steam P1 to a second partial pressure of steam P2, the second partial pressure of steam P2 being from about 50 Torr to about 760 Torr, the second partial pressure of steam P2 being greater than the first partial pressure of steam P1;

heating the soot body during the constant steam pressure step and during the ramp-up steam pressure step; and increasing the temperature during at least one of the constant steam pressure step and the ramp-up steam pressure step.

2. The process of claim 1, further comprising annealing the soot body after heating the soot body, wherein after the annealing, a peak-to-valley difference of hydroxyl concentration amongst a plurality of segments of the body is about 70 ppm or less, the hydroxyl concentration being measured using a Fourier transform infrared spectroscopy in transmission, and the plurality of segments including every adjacent segment across a length and a width of the body, the length being about 25 mm or more and the width being about 25 mm or more.

3. The process of claim 2, wherein the peak-to-valley difference of hydroxyl concentration is about 60 ppm or less.

4. The process of claim 3, wherein the peak-to-valley difference of hydroxyl concentration is about 50 ppm or less.

5. The process of claim 2, wherein the length is about 50 mm or more and the width is about 50 mm or more.

6. The process of claim 5, wherein the length is about 100 mm or more and the width is about 100 mm or more.

7. The process of claim 2, wherein the average hydroxyl concentration of the plurality of segments is about 1500 ppm or less.

8. The process of claim 7, wherein the average hydroxyl concentration of the plurality of segments is about 400 ppm or less.

9. The process of claim 2, wherein, after the annealing, a peak-to-valley difference of titania concentration amongst the plurality of segments of the body is about 0.0100 wt. % or less.

10. The process of claim 1, wherein the first partial pressure of steam P1 is about 5 Torr to about 300 Torr.

11. The process of claim 1, wherein the second partial pressure of steam P2 is about 200 Torr to about 700 Torr.

12. The process of claim 1, wherein the temperature is increased during at least the ramp-up steam pressure step.

13. The process of claim 1, wherein the temperature is increased during at least the constant steam pressure step.

14. The process of claim 1, wherein a time duration of the ramp-up steam pressure step is greater than a time duration of the constant steam pressure step.

15. The process of claim 1, wherein a rate of steam pressure increase during the ramp-up steam pressure step is about 0.1 Torr/hour to about 10 Torr/hour.

16. The process of claim 1, wherein heating the soot body during the constant steam pressure step comprises heating the soot body at a constant temperature T1.

17. The process of claim 1, wherein increasing the temperature begins at the start of the ramp-up steam pressure step.

18. The process of claim 1, wherein increasing the temperature begins before the start of the ramp-up steam pressure step.

19. The process of claim 1, wherein increasing the temperature comprises exposing the soot body to a temperature from about 1050° C. to about 1250° C.

20. The process of claim 1, wherein the glass body is a photomask.

* * * * *